(12) United States Patent
Chen et al.

(10) Patent No.: US 11,595,097 B2
(45) Date of Patent: Feb. 28, 2023

(54) PARTIAL-BANDWIDTH FEEDBACK FOR BEAM COMBINATION CODEBOOK

(71) Applicant: Qualcomm Incorporated, San Diego, CA (US)

(72) Inventors: Bo Chen, Beijing (CN); Yuwei Ren, Beijing (CN); Liangming Wu, Beijing (CN); Yu Zhang, Beijing (CN); Ruifeng Ma, Beijing (CN); Chenxi Hao, Beijing (CN); Renqiu Wang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/429,488

(22) PCT Filed: Feb. 15, 2020

(86) PCT No.: PCT/CN2020/075444
§ 371 (c)(1),
(2) Date: Aug. 9, 2021

(87) PCT Pub. No.: WO2020/164626
PCT Pub. Date: Aug. 20, 2020

(65) Prior Publication Data
US 2022/0109481 A1    Apr. 7, 2022

(30) Foreign Application Priority Data

Feb. 15, 2019 (WO) ................ PCT/CN2019/075247

(51) Int. Cl.
*H04B 7/02* (2018.01)
*H04B 7/06* (2006.01)
(Continued)

(52) U.S. Cl.
CPC ......... *H04B 7/0626* (2013.01); *H04B 7/0456* (2013.01); *H04B 7/063* (2013.01);
(Continued)

(58) Field of Classification Search
CPC .... H04B 7/0626; H04B 7/0456; H04B 7/063; H04B 7/0632; H04B 7/0639; H04B 7/0645; H04L 25/0224
(Continued)

(56) References Cited

U.S. PATENT DOCUMENTS

| | | | |
|---|---|---|---|
| 2014/0098689 A1* | 4/2014 | Lee | H04B 7/0626 370/252 |
| 2016/0094279 A1* | 3/2016 | Prasad | H04L 5/0035 370/329 |

(Continued)

FOREIGN PATENT DOCUMENTS

| | | |
|---|---|---|
| CN | 106302269 A | 1/2017 |
| CN | 106559109 A | 4/2017 |

(Continued)

OTHER PUBLICATIONS

Ericsson: "On Partial Bands and CSI Acquisition", 3GPP TSG-RAN WG1 NR Ad-Hoc#2, R1-1711038, Qingdao, China, Jun. 27-30, 2017, Jun. 30, 2017 (Jun. 30, 2017), pp. 1-3.

(Continued)

*Primary Examiner* — Helene E Tayong
(74) *Attorney, Agent, or Firm* — Holland & Hart LLP

(57) ABSTRACT

Methods, systems, and devices for wireless communications are described. In some systems, a user equipment (UE) may perform channel state information (CSI) measurements on one or more reference signal transmissions received from a base station. Based on the CSI measurements, the UE may generate a CSI report, and the UE may transmit the CSI report to the base station. In some cases, the generated CSI (Continued)

report may include a first portion and a second portion. The first portion may indicate whether the second portion of the CSI report includes full-band CSI feedback or partial-band CSI feedback. The second portion may provide the CSI feedback for one or more identified sub-bands. In some cases, the second portion may include a sub-band index indicating the identified sub-bands. Additionally or alternatively, the second portion may include a bitmap indicating a correspondence between multiple CSI feedback values and multiple corresponding sub-band indexes.

30 Claims, 12 Drawing Sheets

(51) Int. Cl.
   *H04B 7/0456* (2017.01)
   *H04L 25/02* (2006.01)
(52) U.S. Cl.
   CPC ......... *H04B 7/0632* (2013.01); *H04B 7/0639* (2013.01); *H04B 7/0645* (2013.01); *H04L 25/0224* (2013.01)
(58) Field of Classification Search
   USPC ........................................................ 375/267
   See application file for complete search history.

(56) References Cited

U.S. PATENT DOCUMENTS

| | | | | |
|---|---|---|---|---|
| 2018/0062724 | A1* | 3/2018 | Onggosanusi | ........ H04L 5/0048 |
| 2019/0037586 | A1 | 1/2019 | Park et al. | |
| 2019/0109626 | A1* | 4/2019 | Park | ..................... H04B 7/0626 |
| 2019/0166625 | A1* | 5/2019 | Nam | ..................... H04L 1/0058 |
| 2020/0305144 | A1* | 9/2020 | Babaei | .................. H04L 5/0057 |
| 2021/0083743 | A1* | 3/2021 | Faxér | ..................... H04L 5/0064 |

FOREIGN PATENT DOCUMENTS

| | | |
|---|---|---|
| CN | 108024377 A | 5/2018 |
| EP | 3255813 A1 | 12/2017 |
| WO | WO-2018141090 A1 | 8/2018 |
| WO | WO 2018202191 A1 * | 11/2018 |

OTHER PUBLICATIONS

Huawei, et al., "Encoding of Type I and Type II CSI Parameters", 3GPP TSG RAN WG1 Meeting AH NR#3, R1-1715593, Nagoya, Japan, 18-21, Sep. 2017, Sep. 11, 2017, 7 Pages.
International Search Report and Written Opinion—PCT/CN2019/075247—ISA/EPO—dated Nov. 18, 2019.
International Search Report and Written Opinion—PCT/CN2020/075444—ISAEPO—dated Apr. 24, 2020.
3GPP TS 38.214, "3rd Generation Partnership Project, Technical Specification Group Radio Access Network, NR, Physical Layer Procedures for Data (Release 15)", 3GPP TS 38.214-F40, V15.4.0, Dec. 2018, XP051575592, pp. 1-102, Section 5.2.2.4 and 5.2.3.
Supplementary European Search Report—EP20756322—Search Authority—The Hague—dated Oct. 5, 2022.
VIVO: "Discussion on Type II CSI Compression and Feedback Parameters", 3GPP TSG RAN WG1 Ad-Hoc Meeting 1901, R1-1900136 Discussion on CSI Enhancement for MU-MIMO Support Final, 3rd Generation Partnership Project, Mobile Competence Centre, 650, Route Des Lucioles, F-06921 Sophia-Antipolis, vol. RAN WG1, No. Taipei, Jan. 21, 2019-Jan. 25, 2019 Jan. 20, 2019, XP051593062, 6 Pages, Sections 2, 3.

* cited by examiner

| L | Rotation: $\lceil \log_2 (O_1 O_2) \rceil$ | Strongest Coefficient (1 out of 2L): $\lceil \log_2 2L \rceil$ per layer | Wideband Amplitude: $3 \times (2L - 1)$ per layer | Total Wideband Payload | Sub-band Amplitude: $1 \times (K-1)$ per layer | Sub-band Phase: $Z \times (K-1) + 2 \times (2L - K)$ per layer | Full-band CSI Reporting: Total Payload (Wideband + 10 Sub-bands) | Single Sub-band Coefficient per CSI Report: Total Payload (Wideband + 10 Sub-bands) | Five Sub-band Coefficients per CSI Report: Total Payload (Wideband + 10 Sub-bands) |
|---|---|---|---|---|---|---|---|---|---|
| Rank 1 Payload (Bits) | | | | | | | | | |
| 2 | 4 | 2 | 9 | 22 | 3 | 9 | 142 | 34 | 88 |
| 3 | 4 | 3 | 15 | 32 | 3 | 13 | 192 | 48 | 112 |
| 4 | 4 | 3 | 21 | 39 | 5 | 19 | 279 | 63 | 159 |
| Rank 2 Payload (Bits) | | | | | | | | | |
| 2 | 4 | 4 | 18 | 33 | 6 | 18 | 273 | 57 | 153 |
| 3 | 4 | 6 | 30 | 50 | 6 | 26 | 370 | 82 | 210 |
| 4 | 4 | 6 | 42 | 63 | 10 | 38 | 543 | 111 | 303 |

FIG. 4

PARTIAL-BANDWIDTH FEEDBACK FOR BEAM COMBINATION CODEBOOK

CROSS REFERENCE TO RELATED APPLICATIONS

The present application is a 371 national phase filing of International Patent Application No. PCT/CN2020/075444 by Chen et al., "PARTIAL-BANDWIDTH FEEDBACK FOR BEAM COMBINATION CODEBOOK," filed Feb. 15, 2020; and to International Patent Application No. PCT/CN2019/075247 by Chen et al., entitled "PARTIAL-BANDWIDTH FEEDBACK FOR BEAM COMBINATION CODEBOOK," filed Feb. 15, 2019, each of which is assigned to the assignee hereof, and each of which is expressly incorporated by reference in its entirety herein.

BACKGROUND

The following relates generally to wireless communications, and more specifically to partial-bandwidth feedback for beam combination codebooks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some wireless communications systems, wireless devices may perform beamforming to shape or steer an antenna beam along a spatial path from a transmitting wireless device to a receiving wireless device. In some cases, performing beamforming may involve the transmitting wireless device constructing a precoding matrix based on feedback received from the receiving wireless device and precoding transmissions based on the precoding matrix. This precoding procedure may define how the beams are constructed using the different antenna elements of an antenna array at the transmitting wireless device. The amount of feedback generated by and received from the receiving wireless device may increase with the number of beams, layers, and sub-bands over which a beamformed transmission is transmitted. As the amount of feedback increases, the overhead of providing the feedback may result in reduced efficiency or excess latency in the communications for the wireless device.

SUMMARY

The described techniques relate to improved methods, systems, devices, and apparatuses that support partial-bandwidth feedback for beam combination codebooks. Generally, the described techniques provide for reducing feedback overhead of channel state information (CSI) reporting. For example, a user equipment (UE) may implement partial-band CSI reporting to reduce an amount of overhead for reporting CSI feedback while maintaining a relatively high level of performance.

To support partial-band CSI reporting, the UE may perform CSI measurements on one or more reference signal transmissions received from a base station via one or more beams. Based on the CSI measurements, the UE may generate a CSI report for a beam combination codebook for the one or more beams, and the UE may transmit the CSI report to the base station. In some cases, the generated CSI report may include a first portion and a second portion. The first portion of the CSI report may indicate whether partial-band feedback is enabled for the second portion of the CSI report—that is, indicating whether the second portion of the CSI report includes full-band CSI feedback or partial-band CSI feedback. The second portion of the CSI report may provide CSI feedback for one or more identified sub-bands or for a wideband. In some cases, the second portion of the CSI report may include a sub-band index indicating the identified sub-band, or the wideband, for which the UE is to provide CSI feedback. Additionally or alternatively, the second portion of the CSI report may include a bitmap indicating a correspondence between multiple CSI feedback values and multiple corresponding wideband and/or sub-band indexes.

A method of wireless communication at a UE is described. The method may include performing CSI measurements on one or more reference signal transmissions from a base station via one or more beams, generating a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth, and transmitting the CSI report to the base station.

An apparatus for wireless communication at a UE is described. The apparatus may include a processor, memory in electronic communication with the processor, and instructions stored in the memory. The instructions may be executable by the processor to cause the apparatus to perform CSI measurements on one or more reference signal transmissions from a base station via one or more beams, generate a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth, and transmit the CSI report to the base station.

Another apparatus for wireless communication at a UE is described. The apparatus may include means for performing CSI measurements on one or more reference signal transmissions from a base station via one or more beams, generating a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth, and transmitting the CSI report to the base station.

A non-transitory computer-readable medium storing code for wireless communication at a UE is described. The code may include instructions executable by a processor to perform CSI measurements on one or more reference signal transmissions from a base station via one or more beams, generate a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth, and transmit the CSI report to the base station.

Some examples of the method, apparatuses, and non-transitory computer-readable medium described herein may further include operations, features, means, or instructions for determining that the UE may be to report the partial CSI feedback, where the second portion includes an indicator that a value of a parameter in the partial CSI feedback may be a wideband value for the active bandwidth. In some examples of the method, apparatuses, and non-transitory computer-readable medium described herein, the parameter includes an amplitude indicator, a phase indicator, a co-phase indicator, or a combination thereof.

Some examples of the method, apparatuses, and non-transitory computer-readable medium described herein may further include operations, features, means, or instructions for determining that the UE may be to report the partial CSI feedback, where the second portion includes a sub-band index indicating that a value of a parameter in the partial CSI feedback may be for a sub-band corresponding to the sub-band index. In some examples of the method, apparatuses, and non-transitory computer-readable medium described herein, the parameter includes an amplitude indicator, a phase indicator, a co-phase indicator, or a combination thereof.

Some examples of the method, apparatuses, and non-transitory computer-readable medium described herein may further include operations, features, means, or instructions for determining that the UE may be to report the partial CSI feedback, where the second portion includes a bitmap indicating one or more sub-bands associated with corresponding values of one or more parameters of the partial CSI feedback.

Some examples of the method, apparatuses, and non-transitory computer-readable medium described herein may further include operations, features, means, or instructions for performing CSI measurements on the one or more reference signal transmissions includes determining information indicating a RI, a channel quality indicator (CQI), a number of non-zero wideband amplitude coefficients per layer, or a combination thereof, and the first portion of the CSI report indicates the RI, CQI, and the number of non-zero wideband amplitude coefficients per layer, or the combination thereof.

Some examples of the method, apparatuses, and non-transitory computer-readable medium described herein may further include operations, features, means, or instructions for performing CSI measurements on the one or more reference signal transmissions includes determining information indicating a precoding matrix indicator (PMI) for each of the number of non-zero wideband amplitude coefficients per layer, where the second portion of the CSI report includes the information indicating the PMI.

Some examples of the method, apparatuses, and non-transitory computer-readable medium described herein may further include operations, features, means, or instructions for identifying a trigger for transmitting the CSI report to the base station, and determining whether to generate the CSI report including the full CSI feedback or the partial CSI feedback based on a type of the trigger for transmitting the CSI report to the base station.

Some examples of the method, apparatuses, and non-transitory computer-readable medium described herein may further include operations, features, means, or instructions for receiving a CSI feedback configuration from the base station indicating whether the partial CSI feedback may be enabled for the beam combination codebook, where the generating may be based on the CSI feedback configuration. In some examples of the method, apparatuses, and non-transitory computer-readable medium described herein, the CSI feedback configuration further indicates a maximum number of sub-bands for the partial CSI feedback in the CSI report.

Some examples of the method, apparatuses, and non-transitory computer-readable medium described herein may further include operations, features, means, or instructions for determining whether the UE may be to report the full CSI feedback or the partial CSI feedback based on a variation between a wideband CQI measurement and one or more sub-band CQI measurements.

Some examples of the method, apparatuses, and non-transitory computer-readable medium described herein may further include operations, features, means, or instructions for determining whether the UE may be to report the full CSI feedback or the partial CSI feedback based on a variation between a wideband value for the beam combination codebook and one or more sub-band values for the beam combination codebook.

Some examples of the method, apparatuses, and non-transitory computer-readable medium described herein may further include operations, features, means, or instructions for determining whether the UE is to report the full CSI feedback or the partial CSI feedback based on a code rate for the second portion of the CSI report for the full CSI feedback. Some examples of the method, apparatuses, and non-transitory computer-readable medium described herein may further include operations, features, means, or instructions for determining that the UE is to report the full CSI feedback based on the code rate not satisfying a threshold. Some examples of the method, apparatuses, and non-transitory computer-readable medium described herein may further include operations, features, means, or instructions for determining that the UE is to report the partial CSI feedback based on the code rate satisfying a threshold. In some examples of the method, apparatuses, and non-transitory computer-readable medium described herein, the threshold is based on a target code rate corresponding to a modulation and coding scheme, an offset value corresponding to the modulation and coding scheme, or a combination thereof.

In some examples of the method, apparatuses, and non-transitory computer-readable medium described herein, the first portion of the CSI report indicates a number of information bits present in the second portion of the CSI report.

Some examples of the method, apparatuses, and non-transitory computer-readable medium described herein may further include operations, features, means, or instructions for encoding the first portion using a first encoding process to obtain a first codeword, encoding the second portion using a second encoding process to obtain a second codeword, and transmitting the CSI report includes transmitting the first and second codewords.

BRIEF DESCRIPTION OF THE DRAWINGS

FIG. 4 shows a payload size table according to techniques supporting partial-bandwidth feedback for beam combination codebooks in accordance with aspects of the present disclosure.

DETAILED DESCRIPTION

Figure 1:
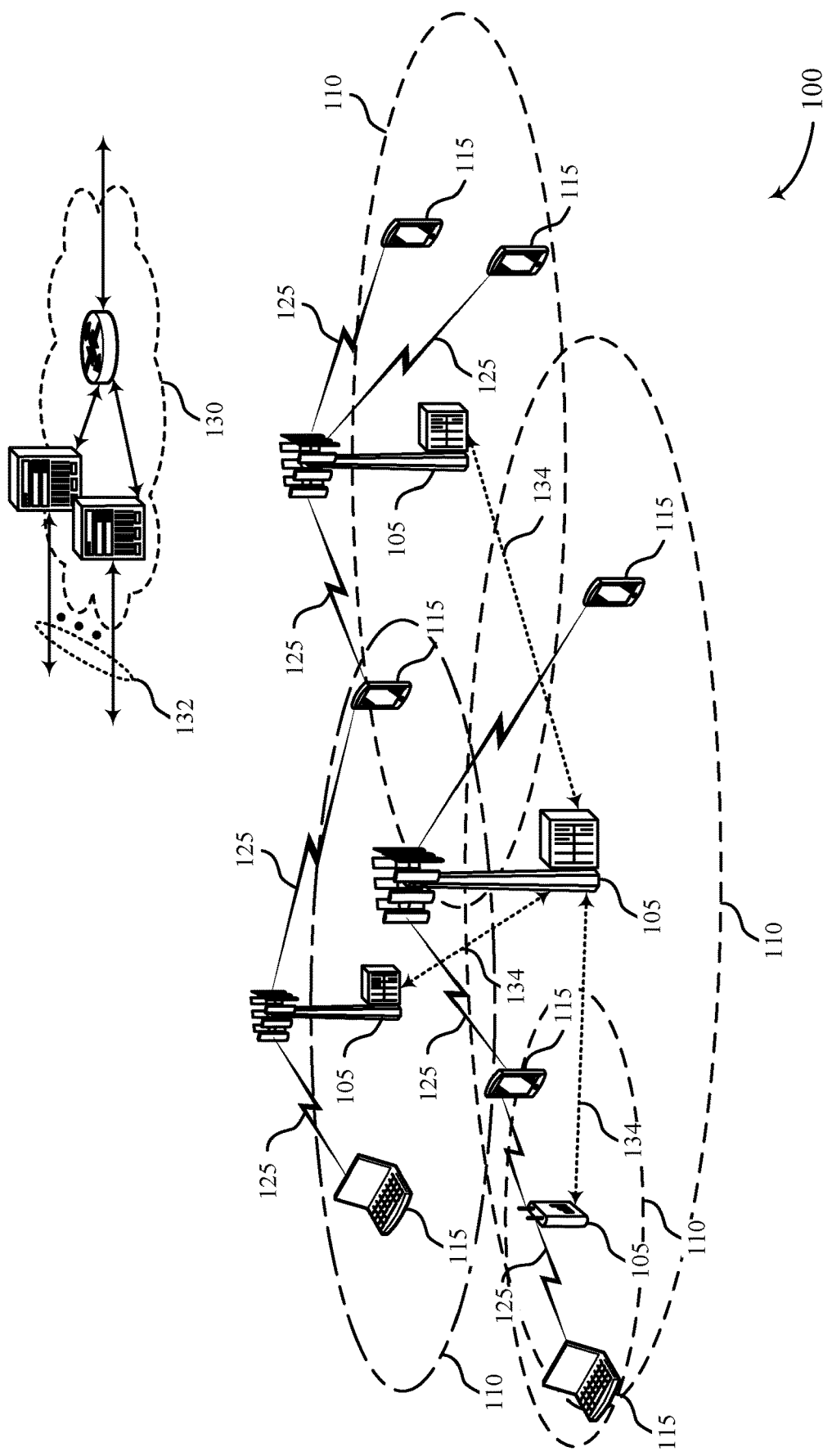
FIG. 1 illustrates an example of a wireless communications system that supports partial-bandwidth feedback for beam combination codebooks in accordance with aspects of the present disclosure.

In some wireless communications systems, a user equipment (UE) may report channel state information (CSI) feedback to a base station for multiple discrete Fourier transform (DFT) beams. The frequency domain of the DFT beams may span a bandwidth part (BWP), which may include one or more sub-bands according to a granularity configured at the UE or the base station. Based on the CSI feedback, the base station may construct a precoding matrix and may precode transmissions over the multiple DFT beams. In some cases, the CSI feedback may include bit representations for a number of precoding coefficients (e.g., a wide-band amplitude scaling factor, a sub-band amplitude scaling factor, a beam combination coefficient corresponding to a phase value, etc.) with respect to a particular beam, polarity, and layer number. Additionally, for a subset of the precoding coefficients (e.g., sub-band amplitude scaling factor and beam combination coefficient), the CSI feedback may include a bit representation for each reporting sub-band of the BWP.

A UE may choose a set of beams for which the UE is to generate beam parameters, and the UE may provide feedback based on a beam combination codebook. Some beam combination codebooks (including, e.g., a New Radio (NR) Type II codebook), may be designed to facilitate relatively high performance (e.g., high throughput) for use with some communications systems. To implement the codebook design, however, a UE may report a relatively large amount of CSI feedback, thus resulting in a relatively large payload size used to transmit the CSI feedback.

Some types of UEs (e.g., low-tier UEs), however, may have a limited amount of available resources for communications (e.g., for CSI reporting). As such, low-tier UEs may have a restricted amount of overhead available to report CSI feedback. In some cases, low-tier UEs may be designed for low mobility and/or for low bandwidth communications. As such, a large payload of CSI feedback may include information that may be implicitly known or that may change relatively infrequently and thus may be reported less frequently as compared to other UEs. Accordingly, techniques are provided herein to enable a UE to reduce an amount of overhead for CSI reporting while maintaining a relatively high level of performance. For example, the UE may provide to the base station CSI feedback for a partial bandwidth including beam parameters for one or more sub-bands in a corresponding CSI report, where the CSI feedback may include full-band CSI feedback or partial-band CSI feedback.

In some cases, a CSI report may include a first portion and a second portion, where the first portion of the CSI report may indicate whether partial-band feedback is enabled for the second portion of the CSI report—that is, indicating whether the second portion of the CSI report includes full-band CSI feedback or partial-band CSI feedback. The second portion of the CSI report may provide CSI feedback for one or more identified sub-bands or for the wideband. In cases in which the CSI feedback includes partial-bandwidth CSI feedback, the UE may indicate CSI feedback for one or more particular sub-bands (e.g., sub-bands that the UE and/or the base station may have identified as more relevant and/or that may more rapidly vary) and not indicate CSI feedback for one or more other sub-bands. In this way, the UE may provide the base station relatively more important CSI feedback information while conserving an amount of signaling overhead by signaling fewer bits as compared to signaling CSI feedback for each sub-band of the full radio frequency bandwidth.

Aspects of the disclosure are initially described in the context of a wireless communications system. Aspects of the disclosure are additionally described in the context of an additional wireless communications system, communications schemes, a payload size table, and a process flow. Aspects of the disclosure are further illustrated by and described with reference to apparatus diagrams, system diagrams, and flowcharts that relate to partial-bandwidth feedback for beam combination codebooks.

FIG. 1 illustrates an example of a wireless communications system 100 that supports partial-bandwidth feedback for beam combination codebooks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT spread OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a base station 105 may precode one or more transmissions to a UE 115 according to a precoding matrix indicator (PMI) codebook used for spatial channel information feedback. The base station 105 may use a specific PMI codebook format based on the rank of the one or more transmissions. For example, if the transmissions have a rank of 1, the precoding matrix W may be a 2×1 matrix equal to a spatial domain compression matrix $W_1$ multiplied by a coefficient matrix $W_2$, where W may be normalized to 1. If the transmissions have a rank of 2, the precoding matrix may be a 2×2 matrix equal to a spatial domain compression matrix $W_1$ multiplied by a coefficient matrix $W_2$, where columns of W may be normalized to $1/\sqrt{2}$.

In general, the precoding matrix W may be a l×r matrix, where l corresponds to a number of layers and r corresponds to rank, that has entries $\tilde{w}_{r,l}$. The base station 105 may determine the precoding matrix (i.e., the precoder) according to $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i},$$

where L may correspond to a total number of transmission beams, $b_{k_1,k_2}$ may correspond to an oversampled two-dimensional (2D) DFT beam, $p_{r,l,i}^{(WB)}$ may correspond to a wideband amplitude scaling factor, $p_{r,l,i}^{(SB)}$ may correspond to a sub-band amplitude scaling factor, and $c_{r,l,i}$ may correspond to a beam combining coefficient. In some cases, L may be configurable (e.g., L∈{2,3,4}). Additionally or alternatively, an amplitude scaling mode may be configured (e.g., by the base station 105) as either a wideband and sub-band mode (e.g., with unequal bit allocation) or a wideband-only mode.

The methods disclosed herein may enable a UE 115 and a base station 105 to reduce an amount of overhead for CSI reporting while maintaining a relatively high level of performance. For example, the UE 115 may provide to the base station 105 CSI feedback for a partial bandwidth including beam parameters for one or more sub-bands in a corresponding CSI report, where the CSI feedback may include full-band CSI feedback or partial-band CSI feedback. The CSI report may include a first portion and a second portion, where the first portion of the CSI report may indicate whether partial-band feedback is enabled for the second portion of the CSI report—that is, indicating whether the second portion of the CSI report includes full-band CSI feedback or partial-band CSI feedback. The second portion of the CSI report may provide CSI feedback for one or more identified sub-bands or for the wideband. In cases in which the CSI feedback includes partial-bandwidth CSI feedback, the UE 115 may indicate CSI feedback for one or more particular sub-bands (e.g., that the UE 115 and/or the base station may have identified as more relevant and/or that may more rapidly vary) and not indicate CSI feedback for one or more other sub-bands. In this way, the UE 115 may provide the base station 105 the relatively most pertinent CSI feedback information while conserving an amount of signaling overhead by signaling fewer bits than full-band CSI reporting.

Figure 2:
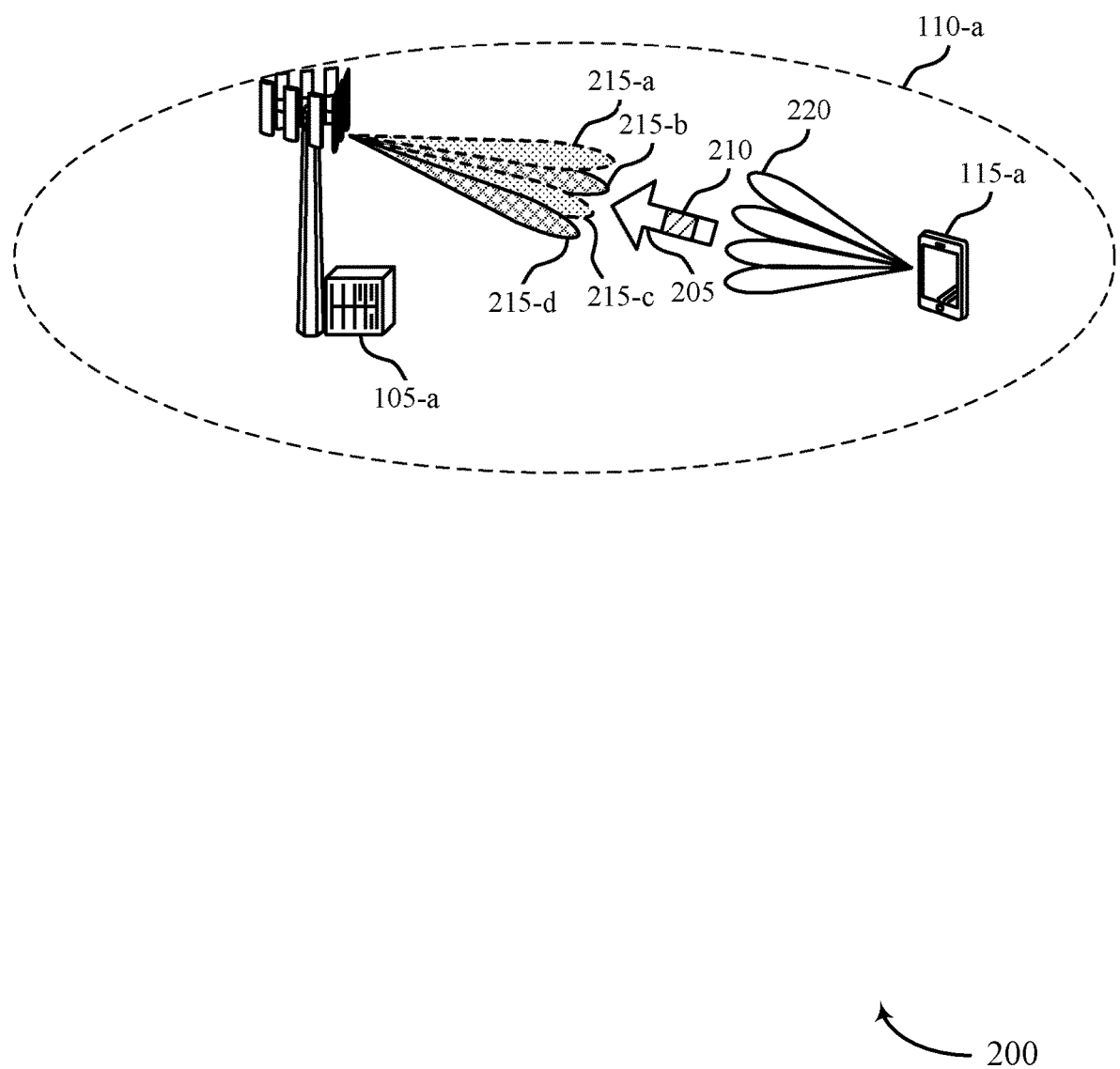
FIG. 2 illustrates an example of a wireless communications system that supports partial-bandwidth feedback for beam combination codebooks in accordance with aspects of the present disclosure.

FIG. 2 illustrates an example of a wireless communications system 200 that supports partial-bandwidth feedback for beam combination codebooks in accordance with aspects of the present disclosure. In the example of FIG. 2, wireless communications system 200 may include a base station 105-a and a UE 115-a, which may be examples of the corresponding devices as described with reference to FIG. 1. The base station 105-a may provide network coverage for a geographic coverage area 110-a. To support communications between the base station 105-a and the UE 115-a, the UE 115-a may transmit CSI feedback 210 to the base station 105-a on an uplink channel 205. For example, the UE 115-a may transmit spatial channel information (e.g., a PMI) feedback in the CSI feedback 210.

The UE 115-a may measure one or more CSI reference signals from the base station 105-a at one or more antenna ports. The CSI reference signals may be transmitted via one or more beams. The UE 115-a may utilize CSI measurements from the one or more antenna ports to determine one or more coefficients (e.g., a wideband beam amplitude scaling factor, a sub-band beam amplitude scaling factor, a beam combining coefficient, etc.) corresponding to a precoding matrix W and to generate a bit representation of each coefficient. Each coefficient may be associated with a set of possible coefficient values for different beam, polarity, and layer combinations. In general, the UE 115-a may choose the set of beams for which the UE 115-a generates the coefficients and provide feedback based on a beam combination codebook. Additionally, some of these coefficients (e.g., the sub-band beam amplitude scaling factor, the beam combining coefficient, etc.) and their corresponding bit representations may vary according to a number of reporting sub-bands within a BWP. As such, the set of possible values for the coefficients may further include coefficient values for each reporting sub-band. The UE 115-a may include bit representations of these sets of coefficient values for each coefficient in the CSI feedback 210 transmitted to the base station 105-a.

In one example, the UE 115-a may determine a wideband amplitude scaling factor $p_{r,l,i}^{(WB)}$ for each beam i, polarity r, and layer l. The wideband amplitude scaling factor $p_{r,l,i}^{(WB)}$ may represent an average amplitude of a beam over all reporting sub-bands and may be represented in the CSI feedback 210 by three (3) bits (e.g., $p_{r,l,i}^{(WB)} \in \{1, \sqrt{0.5}, \sqrt{0.25}, \sqrt{0.125}, \sqrt{0.0625}, \sqrt{0.0313}, \sqrt{0.0156}, 0\}$). Additionally or alternatively, the UE 115-a may determine, for each sub-band, a sub-band amplitude scaling factor $p_{r,l,i}^{(SB)}$ for each beam i, polarity r, and layer l. A sub-band amplitude scaling factor (SB) may represent an amplitude of a beam over a particular reporting sub-band and may be represented in the CSI feedback 210 by one (1) bit (e.g., $p_{r,l,i}^{(SB)} \in \{1, \sqrt{0.5}\}$). Additionally or alternatively, the UE 115-a may determine, for each sub-band, a beam combining coefficient $c_{r,l,i}$ for each beam i, polarity r, and layer l. A beam combining coefficient $c_{r,l,i}$ may represent a phase of a beam over a particular reporting sub-band and may be represented in the CSI feedback 210 by two (2) bits (e.g., to indicate 1 of four (4) phase values if using quadrature phase shift keying (QPSK)) or three (3) bits (e.g., to indicate one of eight (8) phase values if using eight phase shift keying (8PSK)). If represented by, for example, 2 bits, the beam combining coefficient $c_{r,l,i}$ may equal $$e^{j\frac{\pi n}{2}}$$

for n=0, 1, 2, 3 and if represented by, for example, 3 bits, the combining coefficient $c_{r,l,i}$ may equal $$e^{j\frac{\pi n}{4}}$$

for n=0, 1, . . . , 7.

The base station 105-a may use the bit representation of the coefficients in conjunction with layer, polarity, and/or beam information (e.g., beam information as determined from a beam combination codebook) to calculate a precoding matrix W (e.g., as described with reference to FIG. 1). In some cases, the base station 105-a may determine to communicate with the UE 115-a over L base station beams 215 (e.g., a base station beam 215-b and a base station beam 215-d) and may forgo communicating with the UE 115-a over other potential base station beams 215 (e.g., a base station beam 215-a and a base station beam 215-c). As such, the base station 105-b may identify coefficient values corresponding to the L beams from the CSI feedback 210 and may use those values when calculating the precoding matrix W. The base station 105-a may select the L base station beams 215 from a set of oversampled DFT beams such that each of the L base station beams 215 are orthogonal to each other. In one example, the base station beam 215-b and the base station beam 215-d may be orthogonal to one another but may not be orthogonal to the base station beam 215-a and/or the base station beam 215-c. Upon calculating the precoding matrix W, the base station 105-a may select a precoder from a codebook to use for precoding transmissions to the UE 115-a, where the precoder is associated with the calculated precoding matrix. The base station 105-a may accordingly communicate with the UE 115-a using the base station beam 215-b and the base station beam 215-d and one or more UE beams 220.

For a given bandwidth of an active BWP (e.g., the BWP over which the base station 105-a is to communicate with the UE 115-a), the UE 115-a may be configured (e.g., by a base station 105, such as the base station 105-a) with a sub-band size via higher layer signaling (e.g., RRC or MAC signaling). Table 1 shows one example mapping of sub-band sizes, and a corresponding maximum number of reporting sub-bands, according to a number of physical resource blocks (PRBs), of the active carrier BWP:

TABLE 1

Sub-Band Size and Maximum Number of Reporting Sub-bands according to Carrier BWP

| Carrier BWP (PRBs) | Sub-band Size (PRBs) | Maximum Number of Reporting Sub-bands |
|---|---|---|
| <24 | N/A | N/A |
| 24-72 | 4, 8 | 6-18 |
| 73-144 | 8, 16 | 10-18 |
| 145-275 | 16, 32 | 9-18 |

For example, according to Table 1, if the UE 115-a receives transmissions from the base station 105-a over a carrier BWP of thirty-two (32) PRBs, the UE 115-a may be configured with a sub-band size within that BWP of either 4 PRBs or 8 PRBs. If the UE 115-a is configured with the former sub-band size of 4 PRBs, the UE 115-a may determine that the BWP contains 8 reporting sub-bands, and if the UE 115-a is configured with the latter sub-band size of 8 PRBs, the UE 115-a may determine that the BWP contains 4 reporting sub-bands. In general, the UE 115-a may be configured such that the maximum number of reporting sub-bands is less than a threshold number (e.g., eighteen (18)) based on a maximum granularity (e.g., a minimum sub-band size or maximum number of reporting sub-bands) and a variance of the minimum sub-band size with BWP size. For example, according to Table 1, the maximum granularity (e.g., the minimum sub-band size) of a BWP from twenty-four (24) to seventy-two (72) PRBs may be 4 PRBs. As such, a BWP of 72 PRBs, where the UE 115-a is configured with a sub-band size of 4 PRBs, may be associated with 18 reporting sub-bands $$\left(\text{e.g.,} \left(\frac{72}{4}\right) = 18\right).$$

If the BWP increases beyond 72, the maximum granularity may be reduced (e.g., to 8 PRBs) such that there are no more than 18 sub-bands in the BWP.

Some beam combination codebooks (including, e.g., an NR Type II codebook), may be designed to facilitate relatively high performance (e.g., high throughput) for use with some communications systems (e.g., in a communications system operating according to eMBB). To implement the codebook design, however, a UE 115 may report a relatively large amount of CSI feedback 210, thus resulting in a relatively large payload size used to transmit the CSI feedback 210. Table 2 shows an example payload size mapping according to a total number of transmission beams L:

TABLE 2

CSI Feedback Payload Size

| L | Rotation | L-beam Selection | Strongest Coefficient | Wideband Amplitude | Total Wideband Payload | Sub-band Amplitude | Sub-band Phase | Total Payload |
|---|---|---|---|---|---|---|---|---|
| Rank 1 Payload (Bits) | | | | | | | | |
| 2 | 4 | 7 | 2 | 9 | 22 | 3 | 9 | 142 |
| 3 | 4 | 10 | 3 | 15 | 32 | 3 | 13 | 192 |
| 4 | 4 | 11 | 3 | 21 | 39 | 5 | 19 | 279 |
| Rank 2 Payload (Bits) | | | | | | | | |
| 2 | 4 | 7 | 4 | 18 | 33 | 6 | 18 | 273 |
| 3 | 4 | 10 | 6 | 30 | 50 | 6 | 26 | 370 |
| 4 | 4 | 11 | 6 | 42 | 63 | 10 | 38 | 543 |

Table 2 indicates calculated payload sizes, given the parameters: $(N_1, N_2)=(4,4)$, $Z=3$ (8-PSK phase), and K Leading Coefficients. Table 2 includes columns including example values for a number of bits used to indicate: a total number of transmission beams L; a rotation, which may be given by $\lceil \log_2 O_1 O_2 \rceil$; a selection parameter of the beam L; a strongest coefficient (e.g., beam parameter) for 1 out of 2L beams given by $\lceil \log_2 2L \rceil$ bits per layer, a wideband amplitude given by $3\times(2L-1)$ bits per layer, a total number of wideband payload bits; a sub-band amplitude (for each sub-band) given by $1\times(K-1)$ bits per layer; a sub-band phase (for each sub-band) given by $Z\times(K-1)+2\times(2L-K)$ bits per layer; and the resulting total number of bits in the payload based on an example of the number of wideband bits plus the number of bits for ten (10) sub-bands. For example, according to Table 2, for L=2 transmission beams and rank 1 transmissions, a total payload size for wideband and sub-band CSI feedback 210 may be 142 bits; for L=3 transmission beams and rank 1 transmissions, a total payload size for wideband and sub-band CSI feedback 210 may be 192 bits; and so on.

Some types of UEs 115 (e.g., low-tier UEs 115, UEs operating according to NB-IoT, and/or low-tier UEs 115 at or near a cell edge) may have a limited amount of available resources for communications. As such, low-tier and/or cell-edge UEs 115 may not have a relatively large amount of overhead available to report a relatively large amount of CSI feedback 210 according to some codebook designs. In some cases, low-tier UEs 115 may be designed for low mobility (e.g., being fixed in one location) and/or for low bandwidth communications. As such, a large payload of CSI feedback 210 may include information that may be implicitly known or that may change relatively infrequently, and thus may be reported less frequently as compared to other UEs 115. Accordingly, techniques are provided herein to reduce an amount of overhead for CSI reporting while maintaining a relatively high level of performance. For example, the UE 115-a may provide to the base station 105-a CSI feedback for a partial bandwidth including beam parameters for one or more sub-bands in a corresponding CSI report, where the CSI feedback for the partial bandwidth may use a reduced number of bits. For example, whereas full-band CSI feedback may include CSI feedback for a full radio-frequency spectrum bandwidth (or BWP), partial CSI feedback (e.g., CSI feedback for the partial bandwidth) may include CSI feedback for a subset of sub bands of the full radio-frequency spectrum bandwidth or BWP (e.g., CSI feedback particularly for one or more identified sub-bands).

Figure 3A:
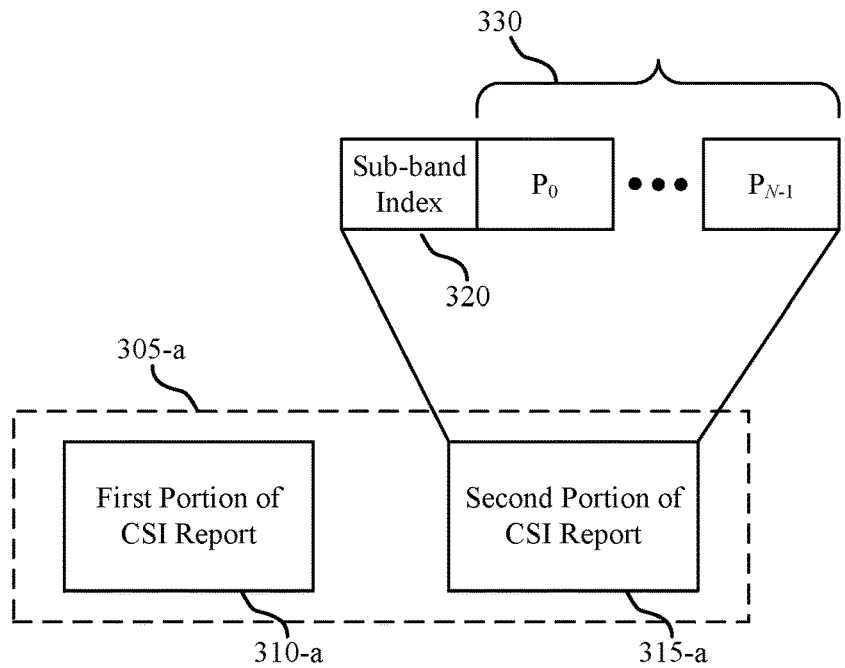
FIGS. 3A and 3B illustrate examples of communications schemes that support partial-bandwidth feedback for beam combination codebooks in accordance with aspects of the present disclosure.

FIG. 3A illustrates an example of a communications scheme 300-a that supports partial-bandwidth feedback for beam combination codebooks in accordance with aspects of the present disclosure. In some examples, the communications scheme 300-a may implement aspects of the wireless communications system 100 and the wireless communications system 200, as described with reference to FIGS. 1 and 2, respectively. According to the communications scheme 300-a shown in FIG. 3A, a UE may provide to a base station CSI feedback for a partial bandwidth including beam parameters (e.g., amplitude, phase) for one sub-band per corresponding CSI report 305 (e.g., a CSI report 305-a). In some examples, the phase may be given as a differential phase between polarizations or layers (e.g., co-phase).

As shown in the example communications scheme 300-a of FIG. 3A, the CSI report 305-a may include a first portion 310-a and a second portion 315-b. The first portion 310-a of the CSI report 305-a may include a rank indicator (RI), a channel quality indicator (CQI), and an indication of a number of beams per layer having non-zero wideband amplitude coefficients. The second portion 315-a of the CSI report 305-a may include PMI value(s) corresponding to beams having a non-zero wideband amplitude coefficient, as indicated in the first portion 310-a of the CSI report 305-a.

As described herein, the UE may determine a wideband amplitude scaling factor representing an average amplitude of a beam over all reporting sub-bands. Similarly, the UE may determine, for each sub-band, a sub-band amplitude scaling factor representing an amplitude of a beam over a particular reporting sub-band. Further, the UE may determine, for each sub-band, a beam combining coefficient representing a phase or co-phase of a beam over a particular reporting sub-band.

In some cases, the first portion 310-a of the CSI report 305-a may further include an indication of whether partial-band feedback is enabled for the second portion 315-a of the CSI report 305-a—that is, whether the second portion 315-a of the CSI report 305-a includes full-band CSI feedback of an active bandwidth (e.g., CSI feedback for the full radio-frequency spectrum bandwidth or BWP) or partial-band CSI feedback of the active bandwidth (e.g., CSI feedback for a subset of sub-bands of the full radio-frequency spectrum bandwidth or BWP). The active bandwidth may be a full bandwidth (e.g., a full bandwidth of a carrier configured for communication) or a BWP (e.g., a subset of the full carrier bandwidth) over which a UE is configured to communicate with a respective base station. For example, the UE may be configured to communication over a carrier including multiple BWPs, where a single BWP is active for the UE for the carrier at a given time. In some cases, the first portion 310-a of the CSI report 305-a may have a fixed payload size, where each field of the payload (e.g., fields for the RI, CQI, and each of the indications) may be encoded separately, for example, using independent codewords that may be decoded independently.

The indication of whether partial-band feedback is enabled for the second portion 315-a of the CSI report 305-a may be included in one or more fields of the first portion 310-a of the CSI report 305-a. For example, the first portion 310-a of the CSI report 305-a may include a field with a first bit value (e.g., a bit value of zero), indicating that the CSI feedback in the second portion 315-a of the CSI report 305-a includes full-band feedback. The first portion 310-a of the CSI report 305-a may further indicate a number of bits (e.g., a payload size and/or a number of the non-zero wideband amplitude coefficients per layer) of the second portion 315-b of the CSI report 305-b. According to the first portion 310-a of the CSI report 305-a indicating full-band CSI feedback, the second portion 315-a of the CSI report 305-a may use the indicated number of bits to indicate the determined wideband amplitude scaling factor, sub-band amplitude scaling factor for each sub-band, and/or the beam combining coefficients for each sub-band (e.g., phase or co-phase feedback).

Alternatively, the indication field of first portion 310-a of the CSI report 305-a may be set to a second bit value (e.g., a bit value of one) indicating that the CSI feedback includes partial-band feedback. That is, the second portion 315-a of the CSI report 305-a may provide CSI feedback for one identified sub-band or for the wideband. In some cases, the second portion 315-a of the CSI report 305-a may include a sub-band index 320, which may include a number of bits that indicate the identified sub-band, or the wideband, for which the UE is to provide CSI feedback. The number of bits may be given by $\lceil \log_2 N_{max,sub} \rceil$, where $N_{max,sub}$ is the maximum number of sub-bands for the system bandwidth or BWP. In one example, $N_{max,sub}$ may be 18, and thus the number of bits may be five (5). The number of bits may be a binary indication of an index corresponding to the identified sub-band or wideband. For example, the UE may set the five bits to values of: "00000" to indicate that the CSI feedback is for the wideband, "00001" to indicate that the CSI feedback is for a first sub-band, "00010" to indicate that the CSI feedback is for a second sub-band, "10010" to indicate that the CSI feedback is for an eighteenth sub-band, and so on. In some cases, values for the bits that do not correspond to existing sub-bands may be reserved to indicate other information. The second portion 315-a may also include a set of beam parameters P 330, which may include N fields or coefficient values, where N may be determined by the number of coefficients C (e.g., amplitude, phase, co-phase), the number of layers L, and the number of non-zero wideband amplitude coefficients per layer Z (e.g., N=C·L·Z). In some cases, the UE may provide CSI feedback for the wideband in one instance and not in subsequent instances (e.g., this feedback may not substantially change in subsequent instances for a low-tier UE). Similarly, the UE may provide CSI feedback for one sub-band in one instance and not in subsequent instances (e.g., may send CSI feedback for different sub-bands in subsequent instances).

In some cases, the UE may be configured for semi-persistent and/or aperiodic CSI reporting. In the cases of semi-persistent and aperiodic CSI reporting, the UE may transmit the first portion 310-a of the CSI report 305-a using a control channel (e.g., a PUCCH, such as a long PUCCH) and transmit the second portion 315-a of the CSI report 305-a using a shared channel (e.g., a physical uplink shared channel (PUSCH)). Alternatively, in such cases, the UE may transmit the first portion 310-a and the second portion 315-a of the CSI report 305-a on the shared channel. In the case of aperiodic CSI reporting, the UE may transmit the CSI report 305-a without a defined periodicity, for example, based on the occurrence of a trigger (e.g., a request for aperiodic CSI from the base station and/or a condition that the UE or the base station detects, such as a high CQI variation).

In the case of semi-persistent CSI reporting, the UE may transmit the CSI report 305-a to the base station periodically at a certain periodicity (e.g., a number of slots). For example, the UE may be configured with a periodicity selected from the set of {5, 10, 20, 30, 80, 160, 320} slots. The UE may, for example, be configured with a relatively longer periodicity if the value for the CSI report 305-a is unlikely to substantially vary at less than the periodicity, or the UE may be configured with a relatively shorter periodicity if the value for the CSI report 305-a is likely to vary more rapidly.

In some cases of semi-persistent CSI reporting, the UE may autonomously determine whether full-band CSI feedback or partial-band CSI feedback is enabled (e.g., according to a previous configuration), which the UE may indicate in the first portion 310-a of the CSI report 305-a, as described herein. Additionally or alternatively, the base station may transmit to the UE a CSI feedback configuration (e.g., via higher layer signaling, such as RRC signaling or MAC control element (CE) signaling) indicating whether full-band CSI feedback or partial-band CSI feedback is enabled, which may trigger the UE to enable the indicated CSI reporting scheme accordingly. In some cases, if partial-band CSI feedback is enabled, the UE may determine (e.g., autonomously) whether to transmit wideband-only CQI feedback or CQI feedback for a specific sub-band based on a variation between a wideband CQI measurement and a CQI measurements for one sub-band (e.g., determining to report CSI feedback for a particular sub-band with a relatively high variation). Additionally or alternatively, the UE may determine (e.g., autonomously) whether to transmit wideband-only CQI feedback or CQI feedback for a specific sub-band based on a variation between a wideband value and a sub-band value for the beam combination codebook (e.g., codebook coefficients). For example, the UE may compare a wideband beam amplitude scaling factor to a sub-band beam amplitude scaling factor for one sub-band to determine whether to transmit wideband-only CQI feedback or CQI feedback for a specific sub-band (e.g., the UE may select one specific sub-band for CQI reporting if the variation between the beam amplitude scaling factors is relatively large, indicating, e.g., a relatively large change in channel conditions).

Additionally or alternatively, if partial-band CSI feedback is enabled, the UE may determine (e.g., autonomously) whether to transmit wideband-only CQI feedback or CQI feedback for a specific sub-band based on a code rate for the second portion 315-a of the CSI report 305-a. For example, the UE may be configured with a particular modulation and coding scheme (MCS) for the CSI feedback, and the configured MCS may indicate a code rate to be used. According to the code for the configured MCS, the UE may determine to report full-band CSI feedback based on a code rate for the second portion 315-a of the CSI report 305-a not satisfying (e.g., being below or below or equal to) an associated threshold (e.g., a code rate threshold that may be predefined or configured by the base station). If, for example, the code rate for the configured MCS exceeds the associated threshold, the UE may use partial-band CSI feedback until the UE uses a subsequent configuration with a code rate that is below the threshold. In some cases, the code rate threshold may be configured according to a target code rate for data transmissions (e.g., PUSCH transmissions) given the configured MCS. Additionally or alternatively, the code rate threshold may be configured according to an offset value (e.g., a beta offset) associated with the second portion 315-a of the CSI report 305-a, where the beta offset may define an offset value associated with the currently configured MCS. For example, the beta offset may indicate an offset value for the threshold associated with a correspondingly greater (or lower) MCS.

Figure 3B:
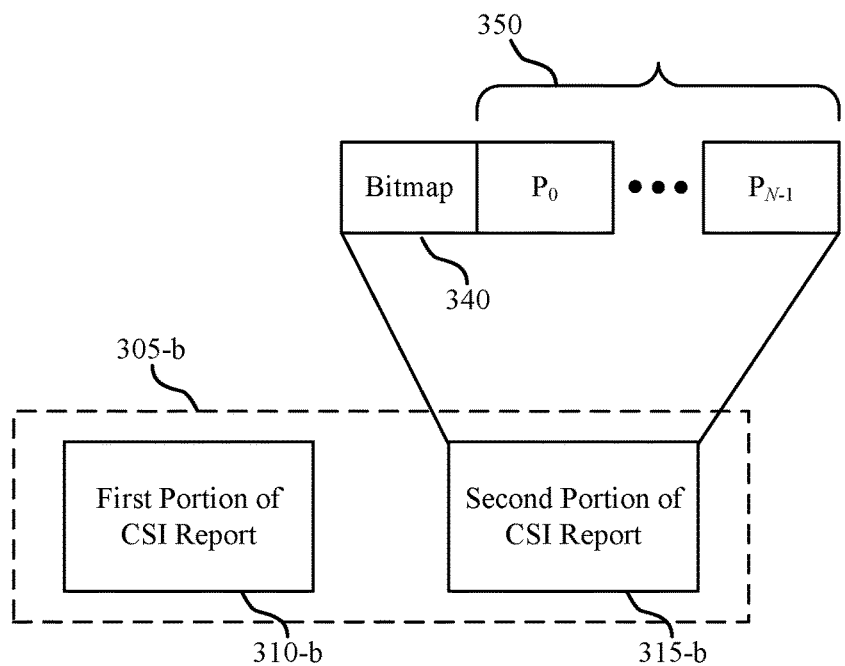

FIG. 3B illustrates an example of a communications scheme 300-b that supports partial-bandwidth feedback for beam combination codebooks in accordance with aspects of the present disclosure. In some examples, the communications scheme 300-b may implement aspects of the wireless communications system 100 and the wireless communications system 200, as described with reference to FIGS. 1 and 2, respectively. According to the communications scheme 300-b shown in FIG. 3A, a UE may provide to a base station CSI feedback for a partial bandwidth with multiple sub-band coefficients per corresponding CSI report 305 (e.g., a CSI report 305-b).

As shown in the example communications scheme 300-b of FIG. 3B, the CSI report 305-b may include a first portion 310-b and a second portion 315-b. The first portion 310-b of the CSI report 305-b may include RI, CQI, and an indication of a number of beams per layer having non-zero wideband amplitude coefficients. The second portion 315-b of the CSI report 305-b may include PMI values corresponding to the beams having non-zero wideband amplitude coefficients, as indicated in the first portion 310-b of the CSI report 305-b.

As described herein, the UE may determine a wideband amplitude scaling factor representing an average amplitude of a beam over all reporting sub-bands. Similarly, the UE may determine, for each sub-band, a sub-band amplitude scaling factor representing an amplitude of a beam over a particular reporting sub-band. Further, the UE may determine, for each sub-band, a beam combining coefficient representing a phase or co-phase of a beam over a particular reporting sub-band.

As similarly described with reference to FIG. 3A, the first portion 310-b of the CSI report 305-b may include an indication of whether partial-band feedback is enabled for the second portion 315-b of the CSI report 305-b—that is, whether the second portion 315-b of the CSI report 305-b includes full-band CSI feedback (i.e., CSI feedback for the full radio-frequency spectrum bandwidth) or partial-band CSI feedback (i.e., CSI feedback for one or more sub-bands of the full radio-frequency spectrum bandwidth). In some cases, the first portion 310-b of the CSI report 305-b may have a fixed payload size, where each field of the payload (e.g., fields for the RI, CQI, and each of the indications) may be encoded separately, for example, using independent codewords that may be decoded independently.

For example, the first portion 310-b of the CSI report 305-b may include a field with a first bit value (e.g., a bit value of zero), indicating that the CSI feedback in the second portion 315-b of the CSI report 305-b includes full-band feedback. The first portion 310-b of the CSI report 305-b may further indicate a number of bits (e.g., a payload size, a number of the non-zero wideband amplitude coefficients per layer) of the second portion 315-b of the CSI report 305-b. According to the first portion 310-b of the CSI report 305-b, the second portion 315-b of the CSI report 305-b may use the indicated number of bits to indicate the determined wideband amplitude scaling factor, sub-band amplitude scaling factor for each sub-band, and the beam combining coefficient for each sub-band (e.g., phase or co-phase feedback).

Alternatively, the indication field of first portion 310-b of the CSI report 305-b may be set to a second bit value (e.g., a bit value of one) indicating that the CSI feedback includes partial-band feedback. That is, the second portion 315-b of the CSI report 305-b may provide CSI feedback for identified sub-band(s), or for the wideband. In some cases, the second portion 315-b of the CSI report 305-b may include a bitmap 340 indicating a correspondence between the reported CSI feedback values and a corresponding wideband and/or sub-band index. For example, the bitmap 340 may include M bits ($a_1 a_2 \ldots a_{M-1} a_M$) indicating such a correspondence, where M is equal to a number of reporting sub-bands that may be derived from a size of the BWP and a size of the sub-band. For example, for each value $a_i$, where i represents an index of an ith sub-band: if $a_i=1$, the CSI report 305-b may include feedback for the ith sub-band, and if $a_i=0$, the CSI report 305-b may not include feedback for the ith sub-band. If, for example, each value of the bitmap is equal to zero, the CSI report 305-b may include feedback for only the wideband. Similarly, if, for example, each value of the bitmap 340 is equal to one, the CSI report 305-b may include feedback for each sub-band. The second portion 315-b may thus include a set of beam parameters P 350, which may include N fields or coefficient values, where N may be determined by the number of coefficients C (e.g., amplitude, phase, co-phase), the number of layers L, the number of non-zero wideband amplitude coefficients per layer Z, and the number of sub-bands M indicated in the bitmap 340 (e.g., $N = C \cdot L \cdot Z \cdot M$). In some cases, the UE may provide CSI feedback for the wideband in one instance and not in subsequent instances (e.g., this feedback may not substantially change in subsequent instances for a low-tier UE). Similarly, the UE may provide CSI feedback for the one or more sub-bands in one instance and not in subsequent instances.

In some cases, the UE may be configured for semi-persistent and/or aperiodic CSI reporting. In the cases of semi-persistent and aperiodic CSI reporting, the UE may transmit the first portion 310-b of the CSI report 305-b using a control channel (e.g., a PUCCH, such as a long PUCCH) and transmit the second portion 315-b of the CSI report 305-b using a shared channel (e.g., a PUSCH). Alternatively, in such cases, the UE may transmit the first portion 310-b and the second portion 315-b of the CSI report 305-b on the shared channel. In the case of aperiodic CSI reporting, the UE may transmit the CSI report 305-b without a defined periodicity, for example, based on the occurrence of a trigger (e.g., a request for aperiodic CSI from the base station, a condition that the UE or the base station detects, such as a high CQI variation).

In the case of semi-persistent CSI reporting, the UE may transmit the CSI report 305-b to the base station periodically at a certain periodicity (e.g., a number of slots). For example, the UE may be configured with a periodicity selected from the set of {5, 10, 20, 30, 80, 160, 320} slots. The UE may, for example, be configured with a relatively longer periodicity if the value for the CSI report 305-b is unlikely to substantially vary at less than the periodicity, or the UE may be configured with a relatively shorter periodicity if the value for the CSI report 305-b is likely to vary more rapidly.

In some cases of semi-persistent CSI reporting, the UE may autonomously determine whether full-band CSI feedback or partial-band CSI feedback is enabled (e.g., according to a previous configuration), which the UE may indicate in the first portion 310-b of the CSI report 305-b, as described herein. Additionally or alternatively, base station may transmit to the UE a CSI feedback configuration (e.g., via higher layer signaling, such as RRC signaling or MAC CE signaling) indicating whether full-band CSI feedback or partial-band CSI feedback is enabled, which may trigger the UE to enable the indicated CSI reporting scheme accordingly. In some cases, if partial-band CSI feedback is enabled, the UE may determine (e.g., autonomously) whether to transmit wideband-only CQI feedback or CQI feedback for multiple sub-bands based on a variation between wideband CQI measurement and one or more sub-band CQI measurements (e.g., determining to report CSI feedback for one or more particular sub-bands with a relatively high variation). Additionally or alternatively, the UE may determine (e.g., autonomously) whether to transmit wideband-only CQI feedback or CQI feedback for multiple sub-bands based on a variation between a wideband value and one or more sub-band values for the beam combination codebook (e.g., codebook coefficients). For example, the UE may compare a wideband beam amplitude scaling factor to one or more sub-band beam amplitude scaling factors to determine whether to transmit wideband-only CQI feedback or CQI feedback for one or more particular sub-bands (e.g., the UE may select one or more specific sub-bands for CQI reporting if the variation between the beam amplitude scaling factors is relatively large, indicating, e.g., a relatively large change in channel conditions).

In some examples, the bitmap 340 may alternatively be represented by a subset selection field, requiring $$\left\lceil \log_2 \binom{M}{K} \right\rceil$$

bits where $$\binom{M}{K}$$

represents a number of combinations for selecting K elements from a vector of size M. For example, the first portion 310-*b* of the CSI report 305-*b* may indicate the number K (e.g., or maximum number) of sub-bands to be selected. The bitmap 340 may be replaced by a combination index that indicates the K elements. For example, for a set of sub-bands given by $M_k$ [$M_0$ $M_1$ ... $M_{K-1}$], the device may determine a set of values $\{X_k\}$ based on the equation $X_k=\Sigma_{i=0}^{K-1}M_i-1$ and the set of $M_k$ values, where $0 \le X_k \le Z-1$ and $Z=\Sigma_{k=0}^{K-1}M_k$. Using these $\{X_k\}$ values, the device may calculate the combination index according to $i_c = \Sigma_{k=1}^{K-1} C_{X_k}^k$, where $$C_x^y = \begin{cases} \binom{x}{y} & x \ge y \\ 0 & x < y \end{cases}.$$

The base station may receive the combination index and determine the indices of the K sub-bands by iteratively determining a sub-band associated with the greatest $C_x^y$ value less than the combination index for each of the K sub-bands.

Accordingly, the partial-bandwidth CSI reporting techniques described herein may reduce an amount of overhead that a UE may use for CSI reporting versus, for example, full-bandwidth CSI reporting. Moreover, the partial-bandwidth CSI reporting techniques described herein may maintain a level of performance that is substantially equivalent to full-bandwidth CSI reporting and/or provides substantially the same benefits as full-bandwidth CSI reporting. For example, in particular, low-tier and/or cell-edge UEs that may not have a large amount of available resources (e.g., time, frequency, and/or spatial resources) for CSI reporting may report the most significant portions of a full-bandwidth CSI report while conserving limited resources. Moreover, each of these advantages may be further significantly improved in cases of relatively low time-frequency variance in channel conditions (e.g., resulting in a low variance between CSI measurements).

FIG. 4 shows a payload size table 400 according to techniques supporting partial-bandwidth feedback for beam combination codebooks in accordance with aspects of the present disclosure. The table shows the payload sizes, given the parameters: ($N_1$, $N_2$)=(4,4), Z=3 (8-PSK phase), and K Leading Coefficients. The payload size table 400 includes a column 405 showing the payload size according to full-band CSI reporting (as similarly shown in FIG. 3), a column 410 showing the payload size according the techniques described herein using CSI reports including coefficients for one sub-band per CSI report (as described, e.g., with reference to FIG. 3A), and a column 415 showing the payload size according the techniques described herein using CSI reports including coefficients for five sub-bands (as described, e.g., with reference to FIG. 3B). As shown in column 410 and column 415, the techniques described herein provide substantially smaller payloads for CSI reporting as compared to the payload sizes for full-band CSI reporting in column 405. For example, according to the payload size table 400, for L=2 transmission beams and rank 1 transmissions, a total payload size CSI feedback according to full-band CSI reporting in column 405 may be 142, while total payload sizes for CSI feedback according to CSI reporting including coefficients for one sub-band coefficient per CSI report and five sub-band coefficients per CSI report may be 34 and 88, respectively, as shown in column 410 and 415. Thus, in either case, the techniques described herein provide a reduction in the total payload sizes for CSI feedback relative to full-band CSI reporting.

Figure 5:
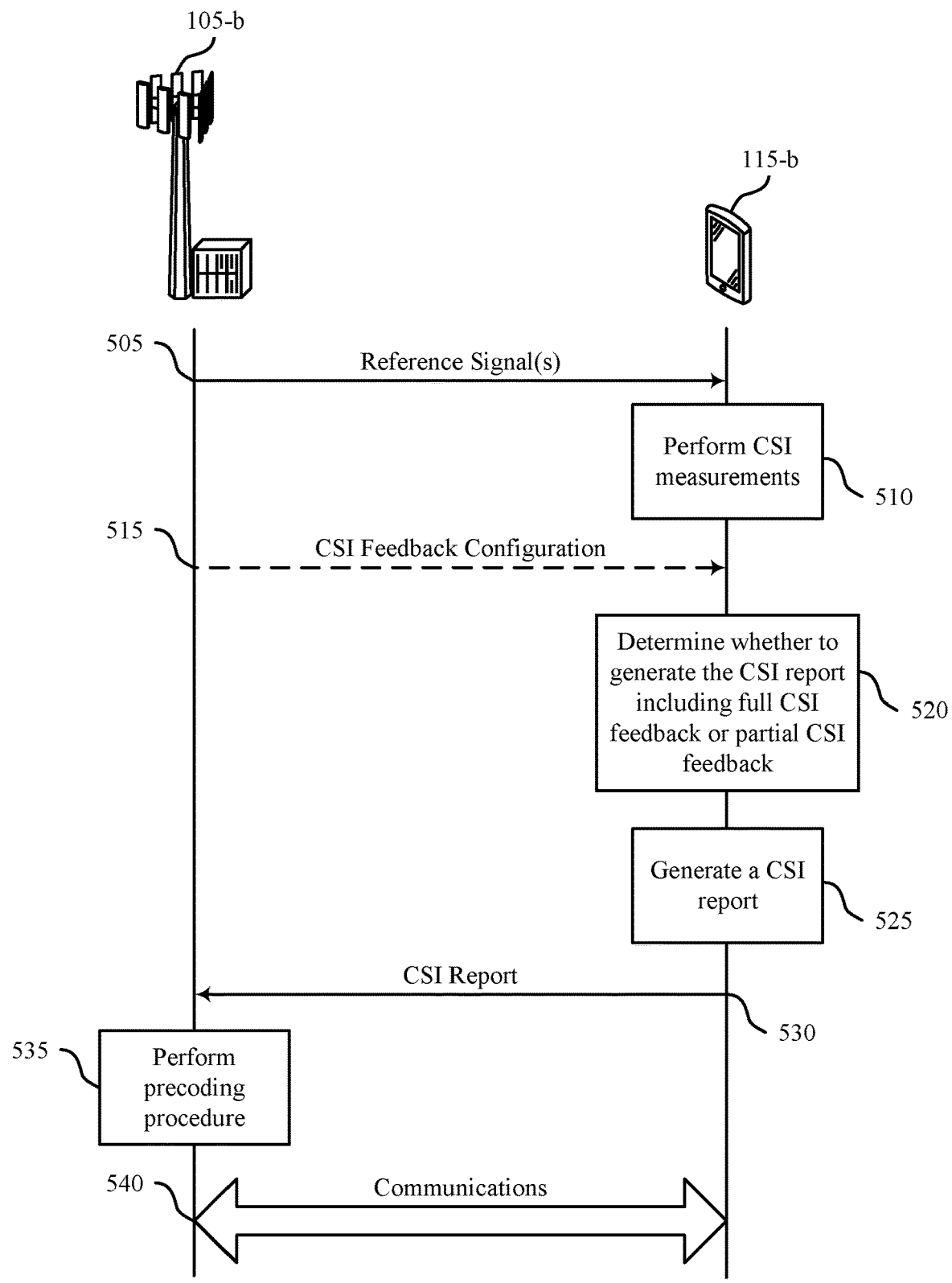
FIG. 5 illustrates an example of a process flow that supports partial-bandwidth feedback for beam combination codebooks in accordance with aspects of the present disclosure.

FIG. 5 illustrates an example of a process flow 500 that supports partial-bandwidth feedback for beam combination codebooks in accordance with aspects of the present disclosure. In some examples, the process flow 500 may implement aspects of the wireless communications system 100 or the wireless communications system 200, as described with reference to FIGS. 1 and 2, respectively. For example, a base station 105 and UE 115, such as a base station 105-*b* and a UE 115-*b*, may perform one or more of the processes described with reference to the process flow 500. These processes may be performed according to the communications schemes 300-*a* and 300-*b*, as described with reference to FIGS. 3A and 3B, respectively. Alternative examples of the following may be implemented, where some steps are performed in a different order than described or are not performed at all. In some cases, steps may include additional features not mentioned below, or further steps may be added.

At 505, the base station 105-*b* may transmit to the UE 115-*b*, and the UE 115-*b* may receive from the base station 105-*b*, one or more reference signals via one or more respective transmit-receive beam pairs.

At 510, the UE 115-*b* may perform CSI measurements on the one or more reference signal transmissions received from the base station 105-*b* at 505 via the one or more beams. In some cases, performing CSI measurements on the one or more reference signal transmissions may include determining information indicating a RI, a CQI, and/or a number of non-zero wideband amplitude coefficients per layer. In some cases, performing CSI measurements on the one or more reference signal transmissions may further include determining information indicating a PMI for each of the number of non-zero wideband amplitude coefficients per layer.

At 515, the base station 105-*b* may transmit to the UE 115-*b*, and the UE 115-*b* may receive from the base station 105-*b*, a CSI feedback configuration. In some cases, the CSI feedback configuration may indicate whether partial CSI feedback is enabled for the beam combination codebook. In some cases, the CSI feedback configuration may further indicate a maximum number of sub-bands for partial CSI feedback in a CSI report.

At 520, the UE 115-*b* may determine whether to generate the CSI report including full CSI feedback for each one or more sub-bands of an active bandwidth or partial CSI feedback for the active bandwidth. In some cases, the CSI report may include indicators of one or more beam parameters (e.g., amplitude, phase, co-phase, etc.) for respective sub-bands. For example, full CSI feedback (or full-band CSI feedback) may include CSI feedback for the full radio-frequency spectrum bandwidth or BWP (e.g., for each of multiple sub-bands of the full bandwidth or of each sub-band of a particular BWP). The CSI feedback may, in some cases, have a configured granularity corresponding to a minimum sub-band size or maximum number of reporting sub-bands. In contrast, partial CSI feedback (or partial-band CSI feedback) may include CSI feedback for a subset of sub-bands of the full radio-frequency spectrum bandwidth or BWP. For example, for a bandwidth configured with 5 sub-bands (e.g., according to a configured granularity), full-band CSI feedback may include CSI feedback for each of the 5 sub-bands, whereas partial-band CSI feedback may include CSI feedback for a subset of the 5 sub-bands (e.g., one or more indicated sub-bands from the 5 sub-bands). In some cases, the UE 115-b may determine whether to generate the CSI report including full CSI feedback or partial CSI feedback based on a variation between a wideband CQI measurement and one or more sub-band CQI measurements and/or a variation between a wideband value for the beam combination codebook one or more sub-band values for the beam combination codebook.

In some cases, the UE 115-b may determine whether to generate the CSI report including full CSI feedback or partial CSI feedback based on a code rate for the second portion of the CSI report, for example, the UE 115-b may determine that the UE 115-b is to report the full CSI feedback based on the code rate not satisfying a threshold, and/or the UE 115-b may determine that the UE 115-b is to report the partial CSI feedback based on the code rate satisfying (e.g., greater than, greater than or equal to) a threshold. In some cases, the threshold may be based on a target code rate corresponding to an associated MCS and/or an offset value (e.g., a beta offset) corresponding to the associated MCS.

In some cases, the UE 115-b may identify a trigger for transmitting the CSI report to the base station 105-b (e.g., a request for aperiodic CSI from the base station 105-b and/or a condition that the UE 115-b or the base station 105-b detects, such as a high CQI variation). The UE 115-b may determine whether to generate the CSI report including full CSI feedback or partial CSI feedback according to the trigger.

At 525, the UE 115-b may generate the CSI report for a beam combination codebook (e.g., a Type II codebook, such as an NR Type II codebook) for the one or more beams. In some cases, the CSI report may include a first portion and a second portion. The first portion may include an indication of whether the second portion includes full CSI feedback for each one or more sub-bands of the active bandwidth or partial CSI feedback for the active bandwidth. In some cases, the first portion may further indicate a number of information bits present in the second portion of the CSI report. In some cases, the first portion may further indicate the RI, CQI, and/r the number of non-zero wideband amplitude coefficients per layer, as the UE 115-b may have determined in the CSI measurements at 510. The second portion may include the information indicating the PMI, as the UE 115-b may have determined in the CSI measurements at 510.

In some cases, the UE 115-b may generate the CSI report according to the determination performed at 520. For example, if the UE 115-b determines at 520 that the UE 115-b is to report partial CSI feedback, the UE 115-b may include in the second portion of the CSI report an indicator that a value of a parameter (e.g., an amplitude, phase, and/or co-phase) in the partial CSI feedback is a wideband value for the active bandwidth. Additionally or alternatively, if the UE 115-b determines 520 that the UE 115-b is to report the partial CSI feedback, may include in the second portion of the CSI report a sub-band index indicating that a value of a parameter (e.g., an amplitude, phase, and/or co-phase) in the partial CSI feedback is for a sub-band corresponding to the sub-band index. Further additionally or alternatively, if the UE 115-b determines at 520 that the UE 115-b is to report partial CSI feedback, may include in the second portion of the CSI report a bitmap indicating one or more sub-bands (e.g., multiple sub-bands) associated with corresponding values of one or more parameters of the partial CSI feedback.

Additionally or alternatively, the UE 115-b may generate the CSI report according to the CSI feedback configuration, as the UE 115-b may have received at 515 (e.g., indicating whether partial CSI feedback is enabled for the beam combination codebook and/or a maximum number of sub-bands for partial CSI feedback in the CSI report).

At 530, the UE 115-b may transmit to the base station 105-b, and the base station 105-b may receive from the UE 115-b, the CSI report, as the UE 115-b may have generated at 520. In some cases, the UE 115-b may encode the CSI report, for example, the UE 115-b may separately encode first portion and the second portion of the CSI report. That is, the UE 115-b may encode the first portion using a first encoding process to obtain a first codeword and encode the second portion using a second encoding process to obtain a second codeword. The UE 115-b may transmit each of the encoded codewords.

At 535, the base station 105-b may perform a precoding procedure for the set of beams using the CSI report, as the base station 105-b may have received at 525. For example, the base station 105-b may perform the precoding procedure using the information indicating the PMI and/or the other parameters included in the CSI feedback.

At 540, the base station 105-b and the UE 115-b may communicate according to the precoding procedure the base station 105-b may have performed at 530.

Figure 6:
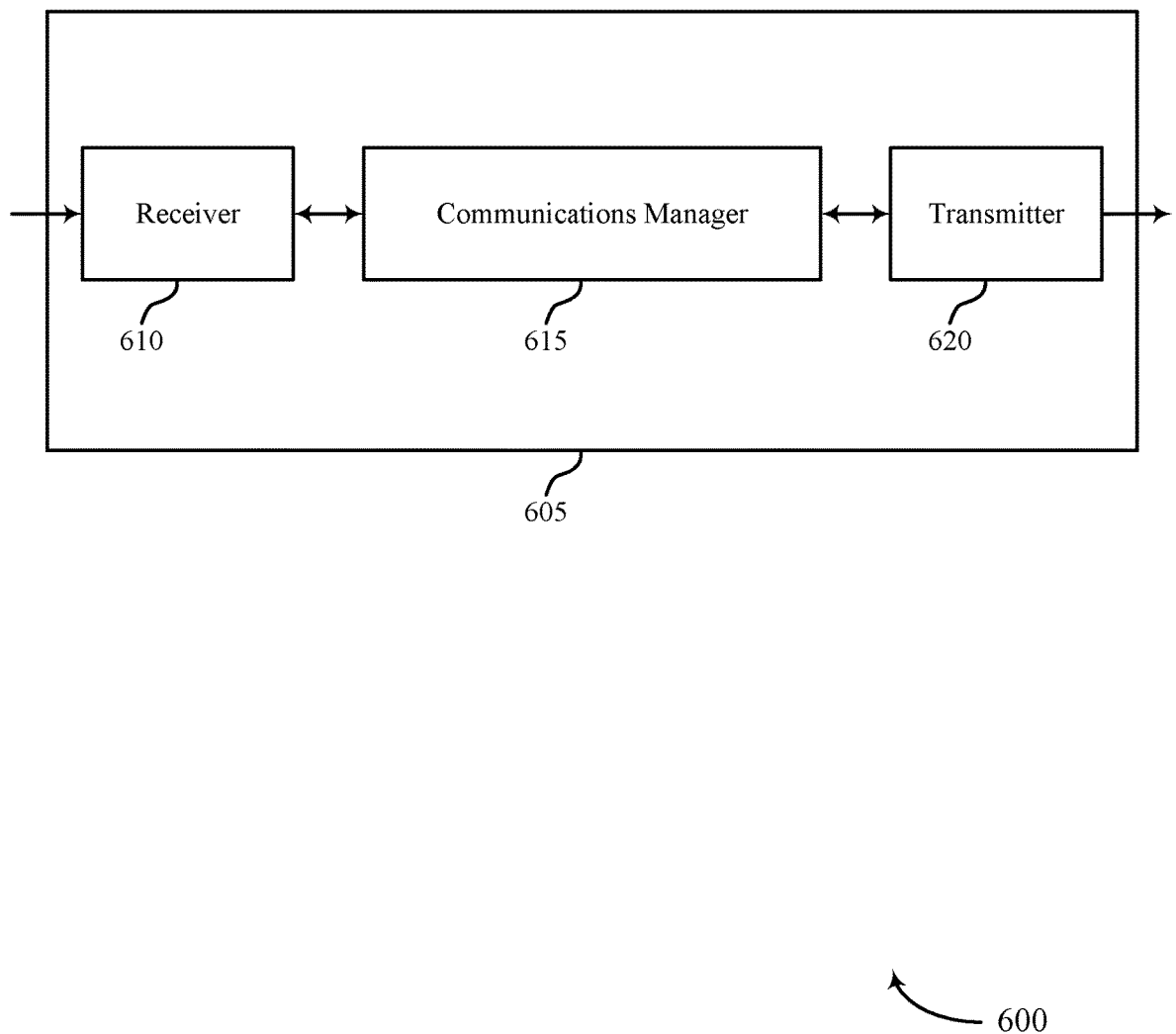
FIGS. 6 and 7 show block diagrams of devices that support partial-bandwidth feedback for beam combination codebooks in accordance with aspects of the present disclosure.

FIG. 6 shows a block diagram 600 of a device 605 that supports partial-bandwidth feedback for beam combination codebooks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to partial-bandwidth feedback for beam combination codebooks, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may perform CSI measurements on one or more reference signal transmissions from a base station via one or more beams, generate a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth, and transmit the CSI report to the base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
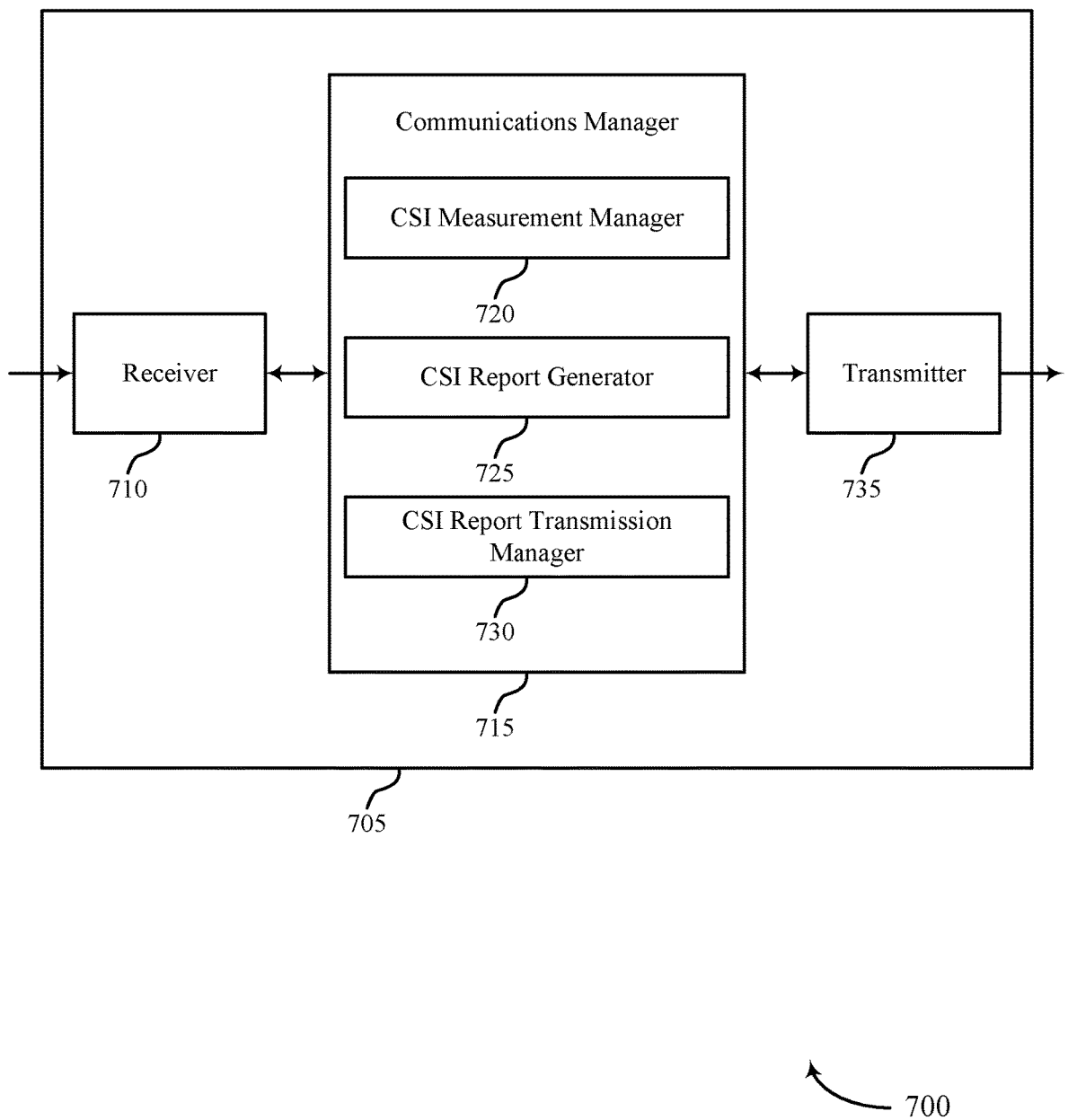

FIG. 7 shows a block diagram 700 of a device 705 that supports partial-bandwidth feedback for beam combination codebooks in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to partial-bandwidth feedback for beam combination codebooks, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CSI measurement manager 720, a CSI report generator 725, and a CSI report transmission manager 730. The communications manager 715 may be an example of aspects of the communications manager 910 described herein.

The CSI measurement manager 720 may perform CSI measurements on one or more reference signal transmissions from a base station via one or more beams.

The CSI report generator 725 may generate a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth.

The CSI report transmission manager 730 may transmit the CSI report to the base station.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
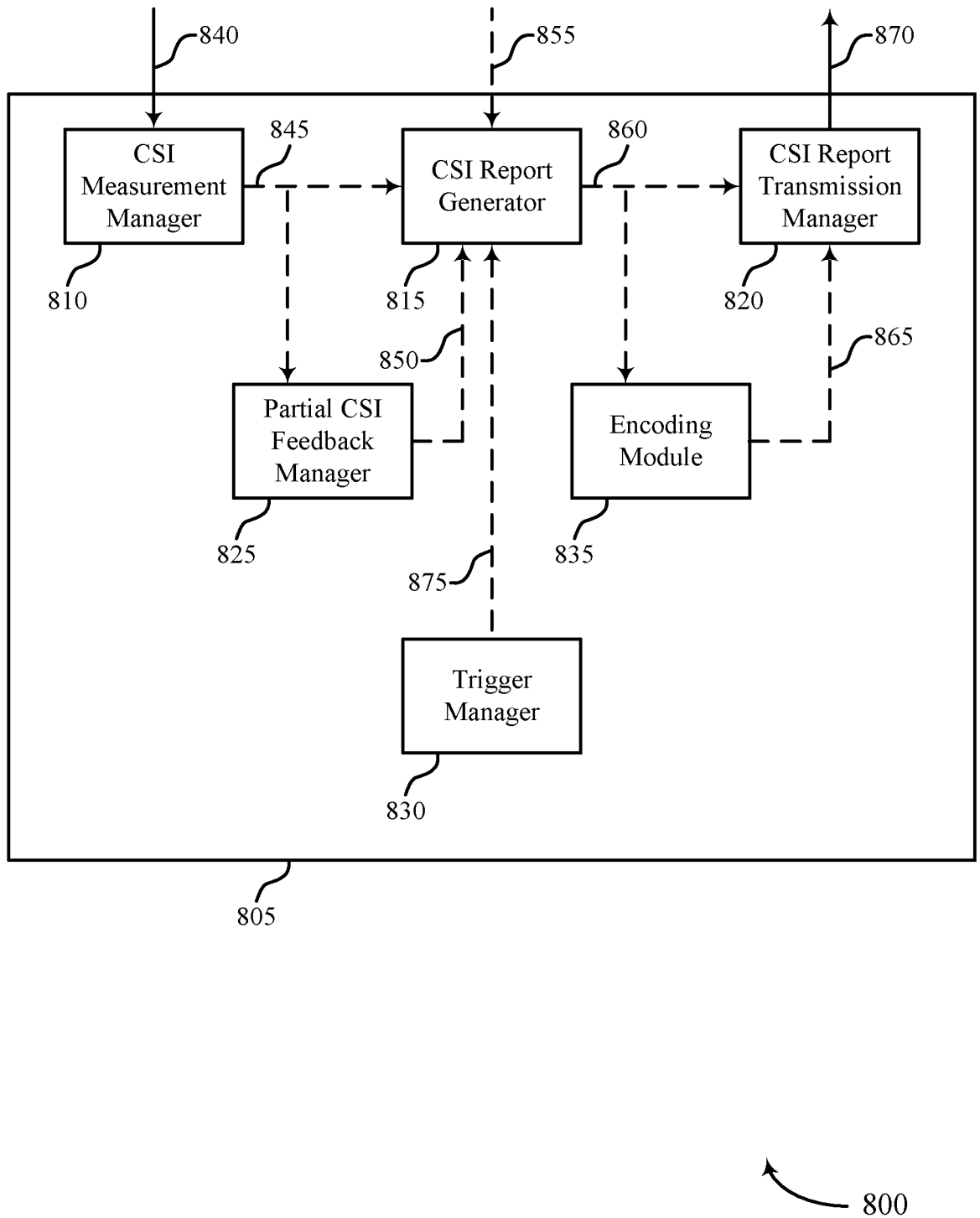
FIG. 8 shows a block diagram of a communications manager that supports partial-bandwidth feedback for beam combination codebooks in accordance with aspects of the present disclosure.

FIG. 8 shows a block diagram 800 of a communications manager 805 that supports partial-bandwidth feedback for beam combination codebooks in accordance with aspects of the present disclosure. The communications manager 805 may be an example of aspects of a communications manager 615, a communications manager 715, or a communications manager 910 described herein. The communications manager 805 may include a CSI measurement manager 810, a CSI report generator 815, a CSI report transmission manager 820, a partial CSI feedback manager 825, a trigger manager 830, and an encoding module 835. Each of these modules may communicate, directly or indirectly, with one another (e.g., via one or more buses).

The CSI measurement manager 810 may perform CSI measurements on one or more reference signal transmissions from a base station via one or more beams. For example, the CSI measurement manager 810 may receive (e.g., from a base station) one or more signals 840 via a transceiver, such as is described with reference to FIG. 9) including information indicating the one or more reference signal transmissions, and the CSI measurement manager 810 may perform the CSI measurements on the one or more received reference signal transmissions. In some examples, performing CSI measurements on the one or more reference signal transmissions includes determining information indicating a RI, a CQI, a number of non-zero wideband amplitude coefficients per layer, or a combination thereof. In some examples, performing CSI measurements on the one or more reference signal transmissions includes determining information indicating a PMI for each of the number of non-zero wideband amplitude coefficients per layer, where the second portion of the CSI report includes the information indicating the PMI. In some examples, the first portion of the CSI report indicates the RI, CQI, and the number of non-zero wideband amplitude coefficients per layer, or the combination thereof.

In some examples, the CSI measurement manager 810 may pass information 845 to the CSI report generator 815 (e.g., directly or indirectly via another component, such as by passing the information 845 to the partial CSI feedback manager 825), where the information 845 may indicate the measurements performed by the CSI measurement manager 810 on the one or more reference signal transmissions.

The CSI report generator 815 may generate a CSI report for a beam combination codebook for the one or more beams (e.g., according to the information 845 received from the CSI measurement manager 810 and/or information 850 received from the partial CSI feedback manager 825), where the CSI report includes a first portion and a second portion. The first portion may include an indication of whether the second portion includes full CSI feedback for each of a set of sub-bands of an active bandwidth or partial CSI feedback for the active bandwidth. In some examples, the CSI feedback configuration may indicate a maximum number of sub-bands for the partial CSI feedback in the CSI report. In some examples, the first portion of the CSI report may indicate a number of information bits present in the second portion of the CSI report.

In some examples, the CSI report generator 815 may receive a signal 855, for example, from the base station (e.g., via a transceiver, such as is described with reference to FIG. 9), including information indicating a CSI feedback configuration indicating whether the partial CSI feedback is enabled for the beam combination codebook. The CSI report generator 815 may generate the CSI report based on the CSI feedback configuration.

In some examples, the CSI report generator 815 may determine whether the UE is to report the full CSI feedback or the partial CSI feedback based on a variation between a wideband CQI measurement and one or more sub-band CQI measurements. In some examples, the CSI report generator 815 may determine whether the UE is to report the full CSI feedback or the partial CSI feedback based on a variation between a wideband value for the beam combination codebook and one or more sub-band values for the beam combination codebook. In some examples, the CSI report generator 815 may determine whether the UE is to report the full CSI feedback or the partial CSI feedback based on a code rate for the second portion of the CSI report. In some examples, the CSI report generator 815 may determine that the UE is to report the full CSI feedback based on the code rate not satisfying a threshold. In some examples, the CSI report generator 815 may determine that the UE is to report the partial CSI feedback based on the code rate satisfying a threshold. In some examples, the threshold may be based on a target code rate corresponding to an MCS and/or an offset value (e.g., a beta offset) corresponding to the associated MCS.

In some examples, the CSI report generator 815 may pass information 860 to the CSI report transmission manager 820 (e.g., directly or indirectly via another component, such as by passing the information 860 to the encoding module 835), where the information 860 may indicate the generated CSI report.

The CSI report transmission manager 820 may transmit the CSI report to the base station (e.g., via a transceiver, such as is described with reference to FIG. 9), for example, according to the information 860 received from the CSI report generator 815 and/or information 865 received from the encoding module 835. For example, the CSI report transmission manager 820 may transmit one or more signals 870 including information corresponding to the CSI report using a set of resources (e.g., configured time, frequency, and/or spatial resources). In some examples, transmitting the CSI report includes transmitting the first and second codewords.

The partial CSI feedback manager 825 may determine that the UE is to report the partial CSI feedback (e.g., according to the information 845 received from the CSI measurement manager 810), where the second portion includes an indicator that a value of a parameter in the partial CSI feedback is a wideband value for the active bandwidth. In some examples, the partial CSI feedback manager 825 may determine that the UE is to report the partial CSI feedback, where the second portion includes a sub-band index indicating that a value of a parameter in the partial CSI feedback is for a sub-band corresponding to the sub-band index. In some examples, the parameter includes an amplitude indicator (e.g., indicator of an amplitude coefficient for the sub-band index), a phase indicator (e.g., indicator of a phase coefficient for the sub-band index0, a co-phase indicator (e.g., indicator of a differential phase between polarizations or layers for the sub-band index), or a combination thereof.

Additionally or alternatively, the partial CSI feedback manager 825 may determine that the UE is to report the partial CSI feedback, where the second portion includes a bitmap indicating one or more sub-bands associated with corresponding values of one or more parameters of the partial CSI feedback. In some examples, the parameter may similarly include an amplitude indicator, a phase indicator, a co-phase indicator, or a combination thereof. In some examples, the partial CSI feedback manager 825 may pass the information 850 to the CSI report generator 815, for example, indicating the determination to report partial CSI feedback.

In some examples, the trigger manager 830 may identify a trigger for transmitting the CSI report to the base station. In some examples, the trigger manager 830 may determine whether to generate the CSI report including the full CSI feedback or the partial CSI feedback based on a type of the trigger for transmitting the CSI report to the base station. In some examples, the trigger manager 830 may pass information 875 to the CSI report generator 815 indicating, for example, that the CSI report generator 815 is to generate the CSI report including the full CSI feedback or the partial CSI feedback based on the trigger, and the CSI report generator 815 may generate the CSI report according to the information 875.

In some examples, the encoding module 835 may receive information 860 from the CSI report generator 815, for example, indicating the generated CSI report including the first portion and the second portion. In some examples, the encoding module 835 may encode the first portion using a first encoding process to obtain a first codeword. In some examples, the encoding module 835 may encode the second portion using a second encoding process to obtain a second codeword.

In some examples, the encoding module 835 may pass the encoded information 865 to the CSI report transmission manager 820, for example, including encoded CSI report. In some examples, the CSI report transmission manager 820 may transmit the CSI report including the first and second codewords, for example, according to the encoded information 865 received from the encoding module 835.

Figure 9:
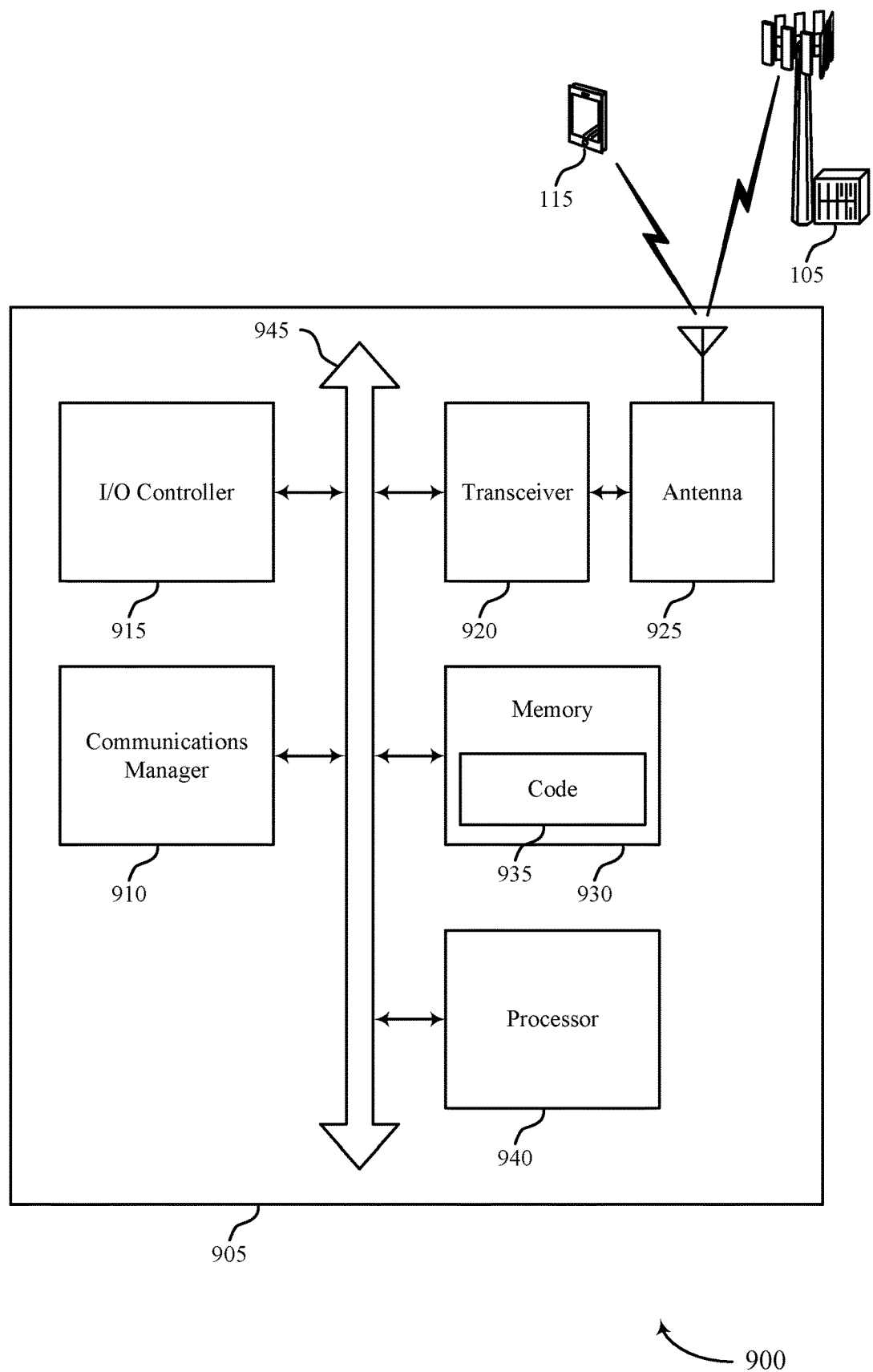
FIG. 9 shows a diagram of a system including a device that supports partial-bandwidth feedback for beam combination codebooks in accordance with aspects of the present disclosure.

FIG. 9 shows a diagram of a system 900 including a device 905 that supports partial-bandwidth feedback for beam combination codebooks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may perform CSI measurements on one or more reference signal transmissions from a base station via one or more beams, generate a CSI report for a beam combination codebook for the one or more beams, the CSI report including a first portion and a second portion, the first portion including an indication of whether the second portion includes full CSI feedback for each of a set of sub-bands of an active bandwidth or partial CSI feedback for the active bandwidth, and transmit the CSI report to the base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting partial-bandwidth feedback for beam combination codebooks).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
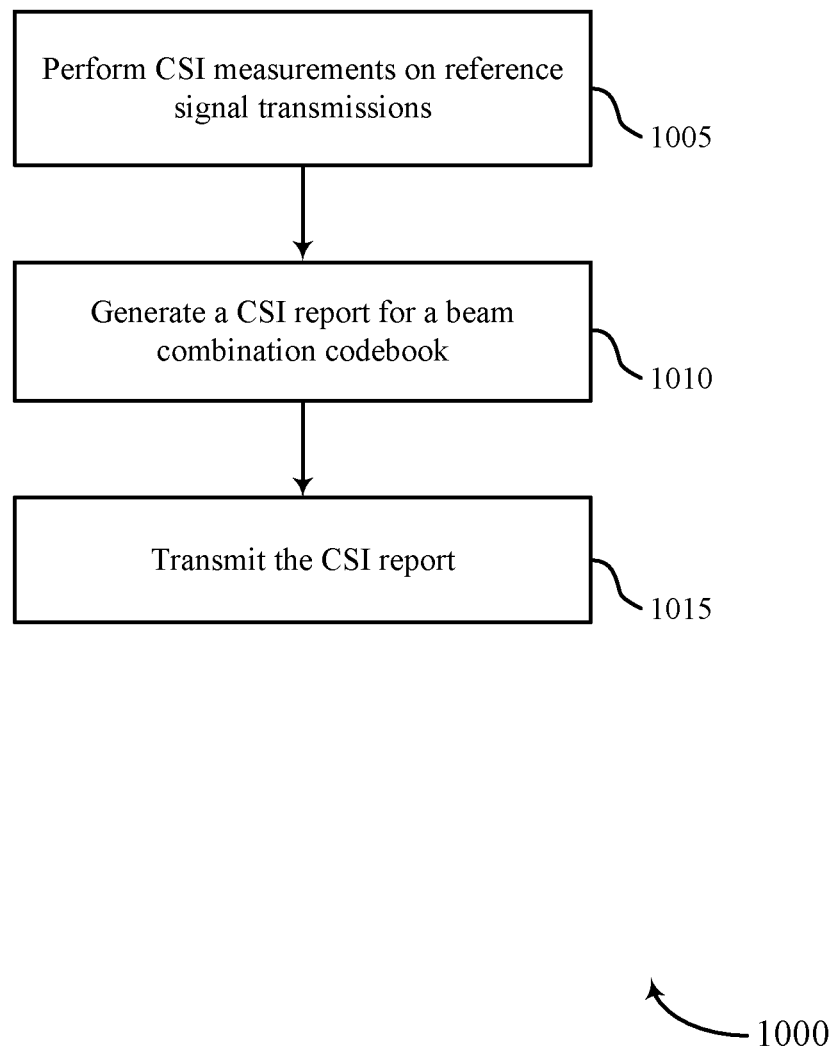
FIGS. 10 through 12 show flowcharts illustrating methods that support partial-bandwidth feedback for beam combination codebooks in accordance with aspects of the present disclosure.

FIG. 10 shows a flowchart illustrating a method 1000 that supports partial-bandwidth feedback for beam combination codebooks in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may perform CSI measurements on one or more reference signal transmissions from a base station via one or more beams. For example, the UE may identify time-frequency resources over which the reference signals may be communicated (e.g., from the base station to the UE), and the UE may receive the reference signals over the identified time-frequency resources. The UE may demodulate the information of the received transmission and decode the demodulated information to obtain a set of information bits for each of the respective one or more reference signals. To perform the CSI measurements, the UE may then measure CQI associated with each of the reference signals for their respective beams. The operations of 1005 may be performed according to the methods described herein. In some examples, aspects of the operations of 1005 may be performed by a CSI measurement manager as described with reference to FIGS. 6 through 9.

At 1010, the UE may generate a CSI report for a beam combination codebook for the one or more beams. The CSI report may include a first portion and a second portion, where the first portion incudes an indication of whether the second portion includes full CSI feedback for each of a set of sub-bands of an active bandwidth or partial CSI feedback for the active bandwidth. For example, according to a determination as to whether the UE is to generate full CSI feedback or partial CSI feedback, the UE may generate CSI feedback, for example, including the information obtained via the CSI measurements. The UE may include the CSI feedback in the generated CSI report. The operations of 1010 may be performed according to the methods described herein. In some examples, aspects of the operations of 1010 may be performed by a CSI report generator as described with reference to FIGS. 6 through 9.

At 1015, the UE may transmit the CSI report to the base station. For example, the UE may identify time-frequency resources over which the CSI report may be transmitted, and the UE may encode and modulate the bits that indicate the CSI report to transmit the encoded and modulated bits over the identified time-frequency resources. The operations of 1015 may be performed according to the methods described herein. In some examples, aspects of the operations of 1015 may be performed by a CSI report transmission manager as described with reference to FIGS. 6 through 9.

Figure 11:
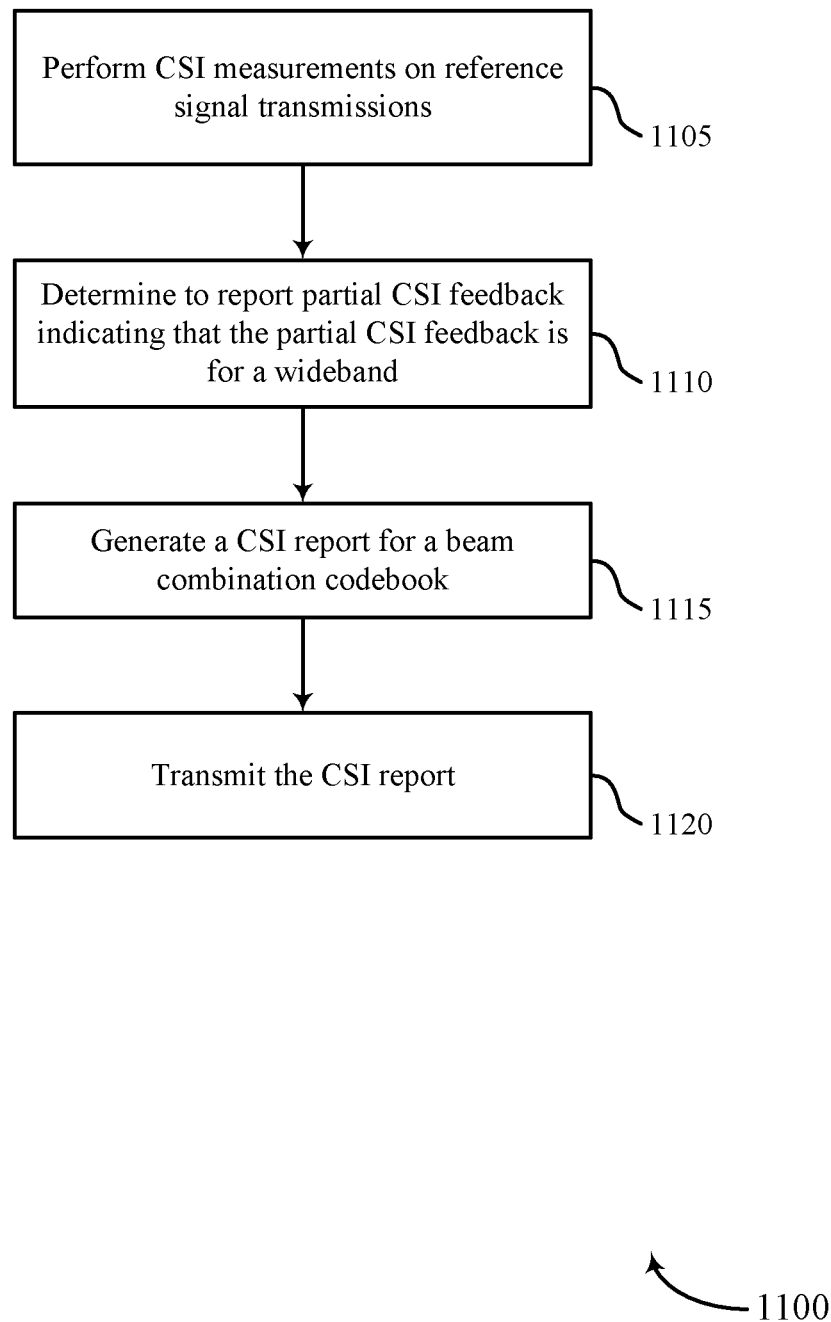

FIG. 11 shows a flowchart illustrating a method 1100 that supports partial-bandwidth feedback for beam combination codebooks in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may perform CSI measurements on one or more reference signal transmissions from a base station via one or more beams. For example, the UE may identify time-frequency resources over which the reference signals may be communicated (e.g., from the base station to the UE), and the UE may receive the reference signals over the identified time-frequency resources. The UE may demodulate the information of the received transmission and decode the demodulated information to obtain a set of information bits for each of the respective one or more reference signals. To perform the CSI measurements, the UE may then measure CQI associated with each of the reference signals for their respective beams. The operations of 1105 may be performed according to the methods described herein. In some examples, aspects of the operations of 1105 may be performed by a CSI measurement manager as described with reference to FIGS. 6 through 9.

At 1110, the UE may determine that the UE is to report the partial CSI feedback, where the second portion includes an indicator that a value of a parameter in the partial CSI feedback is a wideband value for the active bandwidth. For example, the UE may determine to report partial CSI feedback based on a variation between a wideband CQI measurement and one or more sub-band CQI measurements, based on a variation between a wideband value for the beam combination codebook and one or more sub-band values for the beam combination codebook, and/or based on a code rate for the second portion. The operations of 1110 may be performed according to the methods described herein. In some examples, aspects of the operations of 1110 may be performed by a partial CSI feedback manager as described with reference to FIGS. 6 through 9.

At 1115, the UE may generate a CSI report for a beam combination codebook for the one or more beams. The CSI report may include a first portion and a second portion, where the first portion incudes an indication of whether the second portion includes full CSI feedback for each of a set of sub-bands of an active bandwidth or partial CSI feedback for the active bandwidth. For example, according to the determination that the UE is to generate partial CSI feedback, the UE may generate CSI feedback, for example, including the information obtained via the CSI measurements. The UE may include the CSI feedback in the generated CSI report. The operations of 1115 may be performed according to the methods described herein. In some examples, aspects of the operations of 1115 may be performed by a CSI report generator as described with reference to FIGS. 6 through 9.

At 1120, the UE may transmit the CSI report to the base station. For example, the UE may identify time-frequency resources over which the CSI report may be transmitted, and the UE may encode and modulate the bits that indicate the CSI report to transmit the encoded and modulated bits over the identified time-frequency resources. The operations of 1120 may be performed according to the methods described herein. In some examples, aspects of the operations of 1120 may be performed by a CSI report transmission manager as described with reference to FIGS. 6 through 9.

Figure 12:
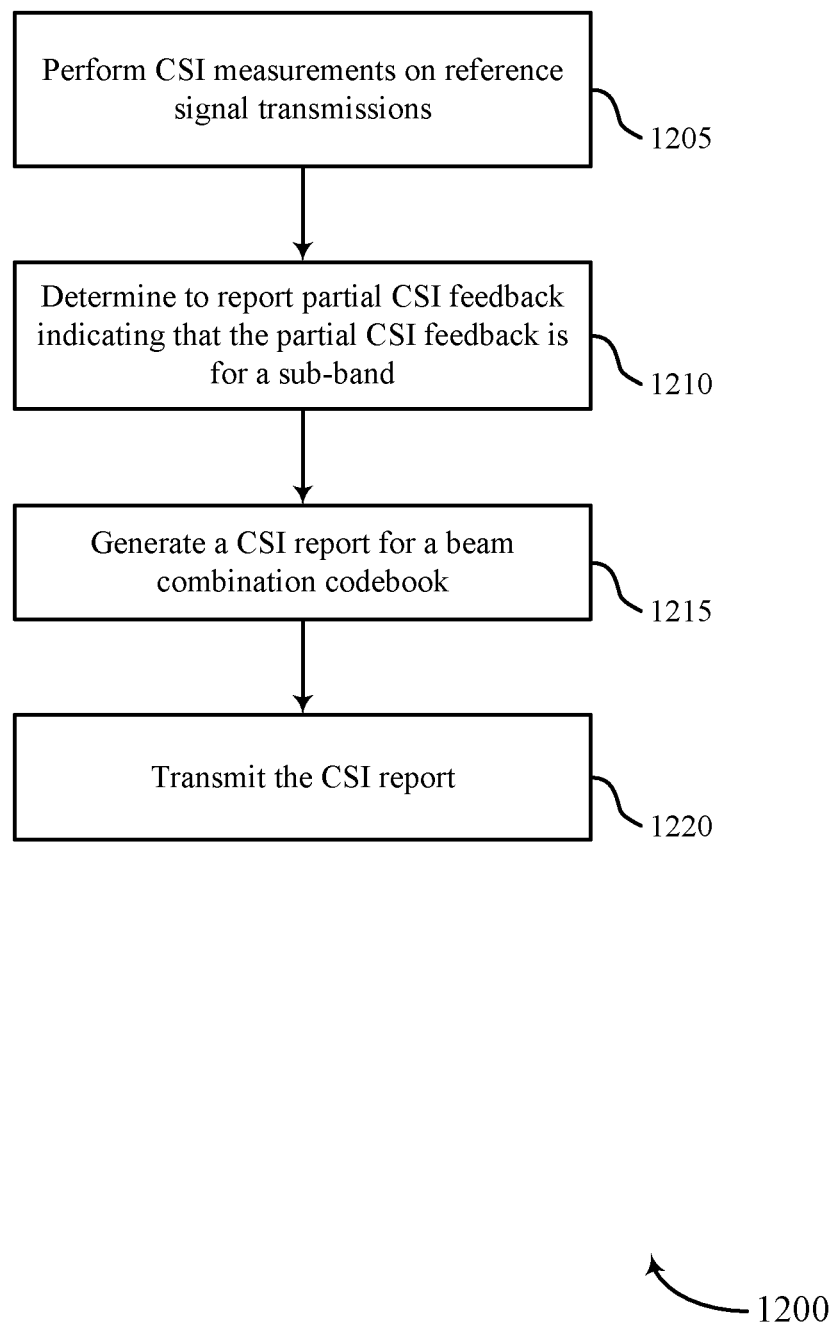

FIG. 12 shows a flowchart illustrating a method 1200 that supports partial-bandwidth feedback for beam combination codebooks in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may perform CSI measurements on one or more reference signal transmissions from a base station via one or more beams. For example, the UE may identify time-frequency resources over which the reference signals may be communicated (e.g., from the base station to the UE), and the UE may receive the reference signals over the identified time-frequency resources. The UE may demodulate the information of the received transmission and decode the demodulated information to obtain a set of information bits for each of the respective one or more reference signals. To perform the CSI measurements, the UE may then measure CQI associated with each of the reference signals for their respective beams. The operations of 1205 may be performed according to the methods described herein. In some examples, aspects of the operations of 1205 may be performed by a CSI measurement manager as described with reference to FIGS. 6 through 9.

At 1210, the UE may determine that the UE is to report the partial CSI feedback, where the second portion includes a sub-band index indicating that a value of a parameter in the partial CSI feedback is for a sub-band corresponding to the sub-band index. For example, the UE may determine to report partial CSI feedback based on a variation between a wideband CQI measurement and one or more sub-band CQI measurements, based on a variation between a wideband value for the beam combination codebook and one or more sub-band values for the beam combination codebook, and/or based on a code rate for the second portion. The operations of 1210 may be performed according to the methods described herein. In some examples, aspects of the operations of 1210 may be performed by a partial CSI feedback manager as described with reference to FIGS. 6 through 9.

At 1215, the UE may generate a CSI report for a beam combination codebook for the one or more beams. The CSI report may include a first portion and a second portion, where the first portion incudes an indication of whether the second portion includes full CSI feedback for each of a set of sub-bands of an active bandwidth or partial CSI feedback for the active bandwidth. For example, according to the determination that the UE is to generate partial CSI feedback, the UE may generate CSI feedback, for example, including the information obtained via the CSI measurements. The UE may include the CSI feedback in the generated CSI report. The operations of 1215 may be performed according to the methods described herein. In some examples, aspects of the operations of 1215 may be performed by a CSI report generator as described with reference to FIGS. 6 through 9.

At 1220, the UE may transmit the CSI report to the base station. For example, the UE may identify time-frequency resources over which the CSI report may be transmitted, and the UE may encode and modulate the bits that indicate the CSI report to transmit the encoded and modulated bits over the identified time-frequency resources. The operations of 1220 may be performed according to the methods described herein. In some examples, aspects of the operations of 1220 may be performed by a CSI report transmission manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
performing channel state information (CSI) measurements on one or more reference signal transmissions from a network entity via one or more beams;
generating a CSI report for a beam combination codebook for the one or more beams, the CSI report comprising a first portion and a second portion, the first portion comprising an indication of whether the second portion comprises full CSI feedback for each of a plurality of sub-bands of an active bandwidth or partial CSI feedback for the active bandwidth; and
transmitting the CSI report to the network entity.

2. The method of claim 1, further comprising:
determining that the UE is to report the partial CSI feedback, wherein the second portion comprises an indicator that a value of a parameter in the partial CSI feedback is a wideband value for the active bandwidth.

3. The method of claim 2, wherein the parameter comprises an amplitude indicator, a phase indicator, a co-phase indicator, or a combination thereof.

4. The method of claim 1, further comprising:
determining that the UE is to report the partial CSI feedback, wherein the second portion comprises a sub-band index indicating that a value of a parameter in the partial CSI feedback is for a sub-band corresponding to the sub-band index.

5. The method of claim 4, wherein the parameter comprises an amplitude indicator, a phase indicator, a co-phase indicator, or a combination thereof.

6. The method of claim 1, further comprising:
determining that the UE is to report the partial CSI feedback, wherein the second portion comprises a bitmap indicating one or more sub-bands associated with corresponding values of one or more parameters of the partial CSI feedback.

7. The method of claim 1, further comprising:
performing CSI measurements on the one or more reference signal transmissions comprises determining information indicating a rank indicator (RI), a channel quality indicator (CQI), a number of non-zero wideband amplitude coefficients per layer, or a combination thereof; and
the first portion of the CSI report indicates the RI, CQI, and the number of non-zero wideband amplitude coefficients per layer, or the combination thereof.

8. The method of claim 7, further comprising:
performing CSI measurements on the one or more reference signal transmissions comprises determining information indicating a precoding matrix indicator (PMI) for each of the number of non-zero wideband amplitude coefficients per layer, wherein the second portion of the CSI report comprises the information indicating the PMI.

9. The method of claim 1, further comprising:
identifying a trigger for transmitting the CSI report to the network entity; and
determining whether to generate the CSI report comprising the full CSI feedback or the partial CSI feedback based at least in part on a type of the trigger for transmitting the CSI report to the network entity.

10. The method of claim 1, further comprising:
receiving a CSI feedback configuration from the network entity indicating whether the partial CSI feedback is enabled for the beam combination codebook, wherein the generating is based at least in part on the CSI feedback configuration.

11. The method of claim 10, wherein the CSI feedback configuration further indicates a maximum number of sub-bands for the partial CSI feedback in the CSI report.

12. The method of claim 1, further comprising:
determining whether the UE is to report the full CSI feedback or the partial CSI feedback based at least in part on a variation between a wideband channel quality indicator (CQI) measurement and one or more sub-band CQI measurements.

13. The method of claim 1, further comprising:
determining whether the UE is to report the full CSI feedback or the partial CSI feedback based at least in part on a variation between a wideband value for the beam combination codebook and one or more sub-band values for the beam combination codebook.

14. The method of claim 1, further comprising:
determining whether the UE is to report the full CSI feedback or the partial CSI feedback based at least in part on a code rate for the second portion of the CSI report for the full CSI feedback.

15. The method of claim 14, further comprising:
determining that the UE is to report the full CSI feedback based at least in part on the code rate not satisfying a threshold.

16. The method of claim 14, further comprising:
determining that the UE is to report the partial CSI feedback based at least in part on the code rate satisfying a threshold.

17. The method of claim 15, wherein the threshold is based at least in part on a target code rate corresponding to a modulation and coding scheme for the CSI report, an offset value corresponding to the modulation and coding scheme, or a combination thereof.

18. The method of claim 1, wherein the first portion of the CSI report indicates a number of information bits present in the second portion of the CSI report.

19. The method of claim 1, further comprising:
encoding the first portion using a first encoding process to obtain a first codeword;

encoding the second portion using a second encoding process to obtain a second codeword; and transmitting the CSI report comprises transmitting the first and second codewords.

20. An apparatus for wireless communication at a user equipment (UE), comprising:
a processor,
memory in electronic communication with the processor; and
instructions stored in the memory and executable by the processor to cause the apparatus to:
perform channel state information (CSI) measurements on one or more reference signal transmissions from a network entity via one or more beams;
generate a CSI report for a beam combination codebook for the one or more beams, the CSI report comprising a first portion and a second portion, the first portion comprising an indication of whether the second portion comprises full CSI feedback for each of a plurality of sub-bands of an active bandwidth or partial CSI feedback for the active bandwidth; and
transmit the CSI report to the network entity.

21. The apparatus of claim 20, wherein the instructions are further executable by the processor to cause the apparatus to:
determine that the UE is to report the partial CSI feedback, wherein the second portion comprises an indicator that a value of a parameter in the partial CSI feedback is a wideband value for the active bandwidth.

22. The apparatus of claim 20, wherein the instructions are further executable by the processor to cause the apparatus to:
determine that the UE is to report the partial CSI feedback, wherein the second portion comprises a sub-band index indicating that a value of a parameter in the partial CSI feedback is for a sub-band corresponding to the sub-band index.

23. The apparatus of claim 20, wherein the instructions are further executable by the processor to cause the apparatus to:
determine that the UE is to report the partial CSI feedback, wherein the second portion comprises a bitmap indicating one or more sub-bands associated with corresponding values of one or more parameters of the partial CSI feedback.

24. The apparatus of claim 20, wherein the instructions are further executable by the processor to cause the apparatus to:
the instructions to perform CSI measurements on the one or more reference signal transmissions are executable by the processor to cause the apparatus to determine information indicating a rank indicator (RI), a channel quality indicator (CQI), a number of non-zero wideband amplitude coefficients per layer, or a combination thereof; and
the first portion of the CSI report indicates the RI, CQI, and the number of non-zero wideband amplitude coefficients per layer, or the combination thereof.

25. The apparatus of claim 20, wherein the instructions are further executable by the processor to cause the apparatus to:
identify a trigger for transmitting the CSI report to the network entity; and
determine whether to generate the CSI report comprising the full CSI feedback or the partial CSI feedback based at least in part on a type of the trigger for transmitting the CSI report to the network entity.

26. The apparatus of claim 20, wherein the instructions are further executable by the processor to cause the apparatus to:
receive a CSI feedback configuration from the network entity indicating whether the partial CSI feedback is enabled for the beam combination codebook, wherein the generating is based at least in part on the CSI feedback configuration.

27. The apparatus of claim 20, wherein the instructions are further executable by the processor to cause the apparatus to:
determine whether the UE is to report the full CSI feedback or the partial CSI feedback based at least in part on one or more of a variation between a wideband channel quality indicator (CQI) measurement and one or more sub-band CQI measurements, a variation between a wideband value for the beam combination codebook and one or more sub-band values for the beam combination codebook, or a combination thereof.

28. The apparatus of claim 20, wherein the instructions are further executable by the processor to cause the apparatus to:
determining whether the UE is to report the full CSI feedback or the partial CSI feedback based at least in part on a code rate for the second portion of the CSI report.

29. An apparatus for wireless communication at a user equipment (UE), comprising:
means for performing channel state information (CSI) measurements on one or more reference signal transmissions from a network entity via one or more beams;
means for generating a CSI report for a beam combination codebook for the one or more beams, the CSI report comprising a first portion and a second portion, the first portion comprising an indication of whether the second portion comprises full CSI feedback for each of a plurality of sub-bands of an active bandwidth or partial CSI feedback for the active bandwidth; and
means for transmitting the CSI report to the network entity.

30. A non-transitory computer-readable medium storing code for wireless communication at a user equipment (UE), the code comprising instructions executable by a processor to:
perform channel state information (CSI) measurements on one or more reference signal transmissions from a network entity via one or more beams;
generate a CSI report for a beam combination codebook for the one or more beams, the CSI report comprising a first portion and a second portion, the first portion comprising an indication of whether the second portion comprises full CSI feedback for each of a plurality of sub-bands of an active bandwidth or partial CSI feedback for the active bandwidth; and
transmit the CSI report to the network entity.

* * * * *